(12) United States Patent
Higuchi et al.

(10) Patent No.: US 8,184,573 B2
(45) Date of Patent: May 22, 2012

(54) BASE STATION, MOBILE STATION, AND SYNCHRONIZATION CHANNEL TRANSMISSION METHOD

(75) Inventors: Kenichi Higuchi, Yokohama (JP);
Yoshihisa Kishiyama, Yokosuka (JP);
Satoshi Nagata, Yokosuka (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 345 days.

(21) Appl. No.: 12/598,143

(22) PCT Filed: Apr. 28, 2008

(86) PCT No.: PCT/JP2008/058200
§ 371 (c)(1),
(2), (4) Date: Jan. 13, 2010

(87) PCT Pub. No.: WO2008/136462
PCT Pub. Date: Nov. 13, 2008

(65) Prior Publication Data
US 2010/0135257 A1    Jun. 3, 2010

(30) Foreign Application Priority Data

May 1, 2007   (JP) .................. 2007-121306
Jun. 19, 2007  (JP) .................. 2007-161946
Aug. 14, 2007  (JP) .................. 2007-211592

(51) Int. Cl.
*H04B 7/212* (2006.01)
(52) U.S. Cl. ...................................... 370/324
(58) Field of Classification Search ............ None
See application file for complete search history.

(56) References Cited

U.S. PATENT DOCUMENTS

| | | | |
|---|---|---|---|
| 6,504,830 B1 * | 1/2003 | Ostberg et al. | 370/342 |
| 2001/0048714 A1 * | 12/2001 | Jha | 375/150 |
| 2006/0215615 A1 * | 9/2006 | Maeda | 370/335 |
| 2009/0323642 A1 * | 12/2009 | Tanno et al. | 370/336 |

FOREIGN PATENT DOCUMENTS

JP    2003-134548 A    5/2003

OTHER PUBLICATIONS

International Search Report w/translation from PCT/JP2008/058200 dated Jun. 10, 2008 (4 pages).
Written Opinion from PCT/JP2008/058200 dated Jun. 10, 2008 (5 pages).
Patent Abstracts of Japan; Publication No. 2003-134548 dated May 9, 2003; NTT DoCoMo Inc.
3GPP TSG RAN WG1 #48bis, R1-071628; "S-SCH Structure for E-Utra Downlink"; NTT DoCoMo et al.; St. Julians, Malta; Mar. 26-30, 2007 (8 pages).

(Continued)

*Primary Examiner* — Raj Jain
(74) *Attorney, Agent, or Firm* — Osha • Liang LLP

(57) ABSTRACT

A base station communicating with a mobile station in a radio communication system by using OFDM for downlink is disclosed. The base station includes a sequence selecting unit configured to select multiple synchronization signal sequences; a synchronization signal generating unit configured to generate a secondary synchronization channel based on a part of the selected synchronization signal sequences and another part of the selected synchronization signal sequences; and a transmitting unit configured to transmit the secondary synchronization channel. The secondary synchronization channel is used to detect cell-specific information.

23 Claims, 27 Drawing Sheets

OTHER PUBLICATIONS

3GPP TSG-RAN WG1#49, R1-072368; "Mapping of Short Sequences for S-SCH"; Nortel; Kobe, Japan; May 7-11, 2007 (4 pages).

3GPP TR 25.814 V7.0.0; "Physical layer aspects for evolved Universal Terrestrial Radio Access (UTRA)"; Jun. 2006 (126 pages).

TSG-RAN WG1 #46bis; R1-062990; "Outcome of cell search drafting session"; Seoul, Korea; Oct. 9-13, 2006 (2 pages).

3GPP TSG RAN WG1 46bis; R1-062636; "Cell Search Performance in Tightly Synchronized Network for E-UTRA"; Seoul, Korea; Oct. 9-13, 2006 (10 pages).

3GPP TSG-RAN WG1 #47bis; R1-070428; "Further analysis of initial cell search for Approach 1 and 2—single cell scenario"; Sorrento, Italy; Jan. 15-19, 2007 (10 pages).

3GPP TS 36.211 V1.0.0; "Physical Channels and Modulation"; Mar. 2007 (30 pages).

3GPP TSG-RAN WG1 LTE Ad Hoc Meeting; R1-060042; "SCH Structure and Cell Search Method in E-UTRA Downlink"; Helsinki, Finland; Jan. 23-25, 2006 (9 pages).

3GPP TSG-RAN WG1 #48-bis; R1-071584; "Secondary Synchronization Signal Design"; Malta; Mar. 26-30, 2007 (7 pages).

Chu, David C.; "Polyphase Codes With Periodic Correlation Properties"; IEEE Trans. Inform. Theory; Jul. 1972; vol. 38; pp. 531-532 (2 pages).

Frank, R.L. et al.; "Phase shift pulse codes with good periodic correlation properties"; IRE Trans. on Info. Theory; vol. IT-8; pp. 381-382; Oct. 1962 (4 pages).

Golay, M.J.E.; "Complementary Series"; IRE Trans. Inform. Theory; vol. 7; pp. 82-87; Apr. 1961 (6 pages).

3GPP TSG RAN WG1 #46bis; R1-062487; "Hierarchical SCH signals suitable for both (FDD and TDD) modes of E-UTRA"; Seoul, Korea; Oct. 9-13, 2006 (4 pages).

3GPP TSG RAN WG1 Meeting #47bis; R1-070146; "S-SCH Sequence Design"; Sorrento, Italy; Jan. 15-19, 2007 (4 pages).

3GPP TSG-RAN WG1 #49; R1-072093; "Details on SSC sequence design" Kobe, Japan; May 7-11, 2007 (5 pages).

3GPP TSG RAN WG1 Meeting #48bis; R1-071641; "Frequency Hopping/Shifting of Downlink Reference Signal in E-UTRA"; St. Julian's, Malta; Mar. 26-30, 2007 (3 pages).

3GPP TSG RAN1 #48bis; R1-071794; "Way forward for stage 2.5 details of SCH"; St. Julian's, Malta; Mar. 26-30, 2007 (1 page).

* cited by examiner

FIG.10

| COMBINATION | P-SCH SEQUENCE NUMBER | SYNCHRONIZATION SIGNAL TRANSMISSION PATTERN |
|---|---|---|
| #1 | #1 | #1 |
| #2 | #1 | #4 |
| #3 | #2 | #1 |
| #4 | #2 | #4 |
| #5 | #3 | #1 |
| #6 | #3 | #4 |
| #7 | #4 | #1 |
| #8 | #4 | #4 |

FIG.11

| COMBINATION | P-SCH SEQUENCE NUMBER | SYNCHRONIZATION SIGNAL TRANSMISSION PATTERN |
|---|---|---|
| #1 | #1 | #2 |
| #2 | #1 | #3 |
| #3 | #2 | #2 |
| #4 | #2 | #3 |
| #5 | #3 | #2 |
| #6 | #3 | #3 |
| #7 | #4 | #2 |
| #8 | #4 | #3 |

FIG.12

| COMBINATION | P-SCH SEQUENCE NUMBER | SYNCHRONIZATION SIGNAL TRANSMISSION PATTERN |
|---|---|---|
| #1 | #1 | #1 |
| #2 | #1 | #2 |
| #3 | #1 | #3 |
| #4 | #2 | #1 |
| #5 | #2 | #2 |
| #6 | #2 | #3 |
| #7 | #3 | #1 |
| #8 | #3 | #2 |
| #9 | #3 | #3 |

FIG.13

| COMBINATION | P-SCH SEQUENCE NUMBER | SYNCHRONIZATION SIGNAL TRANSMISSION PATTERN |
|---|---|---|
| #1 | #1 | #1 |
| #2 | #1 | #2 |
| #3 | #1 | #3 |
| #4 | #1 | #4 |
| #5 | #2 | #1 |
| #6 | #2 | #2 |
| #7 | #2 | #3 |
| #8 | #2 | #4 |

FIG.15

| COMBINATION | P-SCH SEQUENCE NUMBER | SYNCHRONIZATION SIGNAL TRANSMISSION PATTERN |
|---|---|---|
| #1 | #1 | #1 |
| #2 | #1 | #2 |
| #3 | #2 | #1 |
| #4 | #2 | #2 |
| #5 | #3 | #1 |
| #6 | #3 | #2 |
| #7 | #4 | #1 |
| #8 | #4 | #2 |

FIG.17

| COMBINATION | P-SCH SEQUENCE NUMBER | SYNCHRONIZATION SIGNAL TRANSMISSION PATTERN |
|---|---|---|
| #1 | #1 | #1 |
| #2 | #1 | #2 |
| #3 | #1 | #3 |
| #4 | #2 | #1 |
| #5 | #2 | #2 |
| #6 | #2 | #3 |
| #7 | #3 | #1 |
| #8 | #3 | #2 |
| #9 | #3 | #3 |

FIG.19

| COMBINATION | P-SCH SEQUENCE NUMBER | SYNCHRONIZATION SIGNAL TRANSMISSION PATTERN |
|---|---|---|
| #1 | #1 | #1 |
| #2 | #1 | #2 |
| #3 | #1 | #3 |
| #4 | #1 | #4 |
| #5 | #2 | #1 |
| #6 | #2 | #2 |
| #7 | #2 | #3 |
| #8 | #2 | #4 |

FIG.23

| CELL ID | GROUP | S-SCH | FRAME TIMING #1 SEQUENCE NUMBER | FRAME TIMING #2 SEQUENCE NUMBER |
|---|---|---|---|---|
| CELL #1 | #1 | SHORT CODE #1 | 1 (COLLISION) | 1 (COLLISION) |
|  |  | SHORT CODE #2 | 2 | 7 |
| CELL #2 | #2 | SHORT CODE #1 | 1 | 1 |
|  |  | SHORT CODE #2 | 3 | 8 |

FIG.24

| CELL ID GROUP | | S-SCH | FRAME TIMING #1 SEQUENCE NUMBER | FRAME TIMING #2 SEQUENCE NUMBER |
|---|---|---|---|---|
| CELL #1 | #1 | SHORT CODE #1 | ① | ① |
| | | SHORT CODE #2 | 2 | 7 |
| CELL #2 | #2 | SHORT CODE #1 | ① COLLISION | ④ NO COLLISION |
| | | SHORT CODE #2 | 3 | 8 |

FIG.29

| | CELL ID GROUP | S-SCH | COMBINATION OF SHORT CODES USED AT FRAME TIMING #1 | COMBINATION OF SHORT CODES USED AT FRAME TIMING #2 |
|---|---|---|---|---|
| CELL #1 | #1 | SHORT CODE #1 | $M_1$ | $M_2$ |
| | | SHORT CODE #2 | $M_2 \times SC_1$ COLLISION | $M_1 \times SC_2$ NO COLLISION |
| CELL #2 | #2 | SHORT CODE #1 | $M_1$ NO COLLISION | $M_3$ |
| | | SHORT CODE #2 | $M_3 \times SC_1$ | $M_1 \times SC_3$ NO COLLISION |

FIG.30

| SHORT CODE | SCRAMBLING CODE |
|---|---|
| $M_1$ | $SC_1$ |
| $M_2$ | $SC_2$ |
| $M_3$ | $SC_3$ |
| ... | ... |

BASE STATION, MOBILE STATION, AND SYNCHRONIZATION CHANNEL TRANSMISSION METHOD

TECHNICAL FIELD

The present invention generally relates to a radio communication system employing orthogonal frequency division multiplexing (OFDM) for downlink. More particularly, the present invention relates to a base station, a mobile station, and a synchronization channel transmission method.

BACKGROUND ART

A successor communication system to W-CDMA and HSDPA, i.e., Long Term Evolution (LTE), is currently being discussed by 3GPP, a standardization group for W-CDMA. In LTE, orthogonal frequency division multiplexing (OFDM) is to be used as a downlink radio access method and single-carrier frequency division multiple access (SC-FDMA) is to be used as an uplink radio access method (see, for example, 3GPP TR 25.814 (V7.0.0), "Physical Layer Aspects for Evolved UTRA," June 2006).

In OFDM, a frequency band is divided into multiple narrow frequency bands (subcarriers) and data are transmitted on the subcarriers. The subcarriers are densely arranged along the frequency axis such that they partly overlap each other but do not interfere with each other. This approach enables high-speed transmission and improves frequency efficiency.

In SC-FDMA, a frequency band is divided into multiple frequency bands and the frequency bands are allocated to different terminals for transmission in order to reduce interference between the terminals. Also, SC-FDMA reduces variation of the transmission power and therefore makes it possible to reduce power consumption of terminals and to achieve wide coverage.

In OFDM employed in LTE, two types of cyclic prefixes (CP), a long CP and a short CP having different lengths, are provided to reduce the influence of inter-symbol interference caused by a delayed signal. For example, the long CP is used in a cell with a large cell radius or to transmit a multimedia broadcast multicast service (MBMS) signal, and the short CP is used in a cell with a small cell radius. When the long CP is used, the number of OFDM symbols in a slot becomes six; and when the short CP is used, the number of OFDM symbols in a slot becomes seven.

Generally, when a mobile station is powered on, in the standby mode, in communications, or in the intermittent reception mode in a radio communication system employing W-CDMA or LTE, the mobile station has to find a cell proving good radio communication quality for the mobile station based on, for example, a synchronization channel. In other words, the mobile station searches for a cell to be connected via a radio link. Therefore, this process is called "cell search". A cell search method is generally determined based on time necessary for a cell search and the processing load of the mobile station in the cell search. In other words, it is necessary to determine a cell search method so as to reduce the time necessary for a cell search and to reduce the processing load of the mobile station in the cell search.

In W-CDMA, two types of synchronization channels, a primary SCH (P-SCH) and a secondary SCH (S-SCH), are used for the cell search. Also in LTE, it is being discussed to employ the two types of synchronization channels P-SCH and S-SCH.

In a cell search method being discussed, a P-SCH including one sequence and an S-SCH including plural sequences are transmitted once in 5 ms (R1-062990, Outcome of cell search drafting session). In this method, the P-SCH is used to identify a downlink reception timing from each cell, and the S-SCH transmitted in the same subframe is used to determine a reception frame timing and to obtain cell-specific information such as a cell ID or a cell group (group ID). For demodulation and decoding of the S-SCH, a channel estimate obtained based on the P-SCH may generally be used. When cell IDs are grouped, a cell ID of the corresponding cell is found from cell IDs belonging to the obtained group ID. For example, a cell ID may be obtained based on the signal pattern of a pilot signal. As another example, a cell ID may be obtained based on demodulation and decoding results of the P-SCH and the S-SCH. Meanwhile, when cell IDs are not grouped, the cell ID of the corresponding cell may be included in the S-SCH as an information item. In this case, the mobile station may obtain the cell ID by just demodulating and decoding the S-SCH.

However, if the above cell search method is applied to an inter-base-station synchronous system where signals from multiple cells are synchronized, S-SCHs transmitted from the cells using different sequences are demodulated and decoded based on channel estimates obtained based on P-SCHs transmitted from the cells using the same sequence. This in turn may degrade the transmission characteristics of the S-SCHs. Here, the transmission characteristics may include the time necessary for a cell search. Meanwhile, in an inter-base-station asynchronous system where signals from multiple cells are not synchronized, the above problem may not occur because the reception timings of P-SCH sequences transmitted from the cells are different from each other.

To prevent the above described characteristic degradation of S-SCHs in an inter-base-station synchronous system, a cell search method where plural sequences, for example, three or seven sequences, are used for P-SCHs is being studied (R1-062636, Cell Search Performance in Tightly Synchronized Network for E-UTRA). Also to prevent the above described characteristic degradation of S-SCHs in an inter-base-station synchronous system, a cell search method where P-SCHs are transmitted from plural cells at different transmission intervals has been proposed (R1-070428, Further analysis of initial cell search for Approach 1 and 2—single cell scenario). This method makes it possible to use P-SCHs received from plural cells at different reception timings for the demodulation and decoding of S-SCHs and thereby to prevent the characteristic degradation of the S-SCHs.

From the view point of cell design, it is preferable to use as many sequences as possible for P-SCHs in the method described in R1-062636 and as many different transmission intervals as possible for transmitting P-SCHs in the method described in R1-070428. If the number of sequences used for P-SCHs is small, the probability that the same sequence is used for P-SCHs of adjacent cells increases. Also, if the number of different transmission intervals for transmitting P-SCHs is small, the probability that P-SCHs of adjacent cells are transmitted at the same transmission interval increases. This in turn increases the probability of occurrence of characteristic degradation of S-SCHs in an inter-base-station synchronous system.

Meanwhile, the time necessary for a cell search, i.e., the transmission characteristics in a cell search, and the processing load of the mobile station in a cell search are incompatible with each other. Therefore, it is preferable to configure a system to enable the user to select whether to attach importance to the transmission characteristics in a cell search or to the processing load of the mobile station in a cell search by setting parameters or by changing operational methods.

DISCLOSURE OF INVENTION

Problems to be Solved by the Invention

However, the above background art technologies have problems as described below.

As described above, synchronization channels (SCH) are downlink signals used for cell searches. A hierarchical SCH structure is to be employed for the synchronization channels (see, for example, 3GPP TS 36.211 V1.0.0 (2007-03)). In the hierarchical SCH structure, the synchronization channels are composed of two subchannels: a primary synchronization channel (primary SCH) and a secondary synchronization channel (secondary SCH).

The secondary synchronization channel is used to report cell-specific information such as a cell ID group, a radio frame timing, and the number of transmitting antennas. The user equipment detects the cell-specific information by detecting secondary synchronization channel sequences.

As described above, in wideband code division multiple access (W-CDMA), a neighboring cell search is performed for handover and cell-specific information (neighboring cell information) of neighboring cells is reported to the user equipment before the neighboring cell search is performed. Meanwhile, in the LTE system, whether to report neighboring cell information has not been decided yet. In the neighboring cell search performed during communications or during the standby mode to find a handover destination cell, it is possible to reduce the number of candidates of cell-specific information that have to be detected if neighboring cell information is reported in advance.

A mapping method for secondary synchronization channel sequences has been proposed. In the proposed mapping method, different sequences are mapped along the frequency direction (see, for example, 3GPP R1-060042 "SCH Structure and Cell Search Method in E-UTRA Downlink" and 3GPP R1-071584 "Secondary Synchronization Signal Design"). FIG. 1 shows an example of this method where an orthogonal sequence 1 ($P_1(0), P_1(1), \ldots, P_1(31)$) and an orthogonal sequence 2 ($P_2(0), P_2(1), \ldots, P_2(31)$) are mapped to alternate subcarriers. FIG. 2 shows another example where an orthogonal sequence 1 ($P_1(0), P_1(1), \ldots, P_1(31)$) and an orthogonal sequence 2 ($P_2(0), P_2(1), \ldots, P_2(31)$) are mapped, respectively, to consecutive subcarriers. Dividing a sequence into multiple sequences as shown in these examples makes it possible to increase the number of patterns that can be transmitted. For example, while only 64 patterns are available when one sequence with a sequence length of 64 is used, 1024 patterns are available when two sequences having a sequence length of 32 are used as shown in FIG. 2.

One object of the present invention is to solve or reduce one or more of the above problems and to provide a base station, a mobile station, and a synchronization channel transmission method that make it possible to reduce the number of candidates of cell-specific information that have to be detected in a neighboring cell search.

Means for Solving the Problems

An aspect of the present invention provides a base station communicating with a mobile station in a radio communication system by using OFDM for downlink. The base station includes a sequence selecting unit configured to select multiple synchronization signal sequences; a synchronization signal generating unit configured to generate a secondary synchronization channel based on a part of the selected synchronization signal sequences and another part of the selected synchronization signal sequences; and a transmitting unit configured to transmit the secondary synchronization channel. The secondary synchronization channel includes cell-specific information.

Another aspect of the present invention provides a mobile station communicating with a base station in a radio communication system by using OFDM for downlink. The base station is configured to select multiple synchronization signal sequences and to generate a secondary synchronization channel based on a part of the selected synchronization signal sequences and another part of the selected synchronization signal sequences. The mobile station includes a detection unit configured to detect cell-specific information based on the secondary synchronization channel.

Still another aspect of the present invention provides a synchronization channel transmission method in a radio communication system including a base station communicating with a mobile station by using OFDM for downlink. The method includes a sequence selecting step, performed by the base station, of selecting multiple synchronization signal sequences; a synchronization signal generating step, performed by the base station, of generating a secondary synchronization channel based on a part of the selected synchronization signal sequences and another part of the selected synchronization signal sequences; and a transmitting step, performed by the base station, of transmitting the secondary synchronization channel. The mobile station detects cell-specific information based on the secondary synchronization channel.

Advantageous Effect of the Invention

An aspect of the present invention provides a base station, a mobile station, and a synchronization channel transmission method that make it possible to reduce the number of candidates of cell-specific information that have to be detected in a neighboring cell search.

BRIEF DESCRIPTION OF THE DRAWINGS

FIG. 10 is a table showing exemplary combinations of P-SCH sequences and synchronization signal transmission patterns;

FIG. 11 is a table showing exemplary combinations of P-SCH sequences and synchronization signal transmission patterns;

FIG. 12 is a table showing exemplary combinations of P-SCH sequences and synchronization signal transmission patterns;

FIG. 13 is a table showing exemplary combinations of P-SCH sequences and synchronization signal transmission patterns;

FIG. 15 is a table showing exemplary combinations of P-SCH sequences and synchronization signal transmission patterns;

FIG. 17 is a table showing exemplary combinations of P-SCH sequences and synchronization signal transmission patterns;

FIG. 19 is a table showing exemplary combinations of P-SCH sequences and synchronization signal transmission patterns;

FIG. 23 is a table used to describe an exemplary method of mapping short codes;

FIG. 24 is a drawing illustrating an exemplary method of mapping short codes according to an embodiment of the present invention;

FIG. 29 is a table used to describe an exemplary method of mapping short codes; and FIG. 30 is a table showing the correspondence between short codes and scrambling codes.

Figure 1:
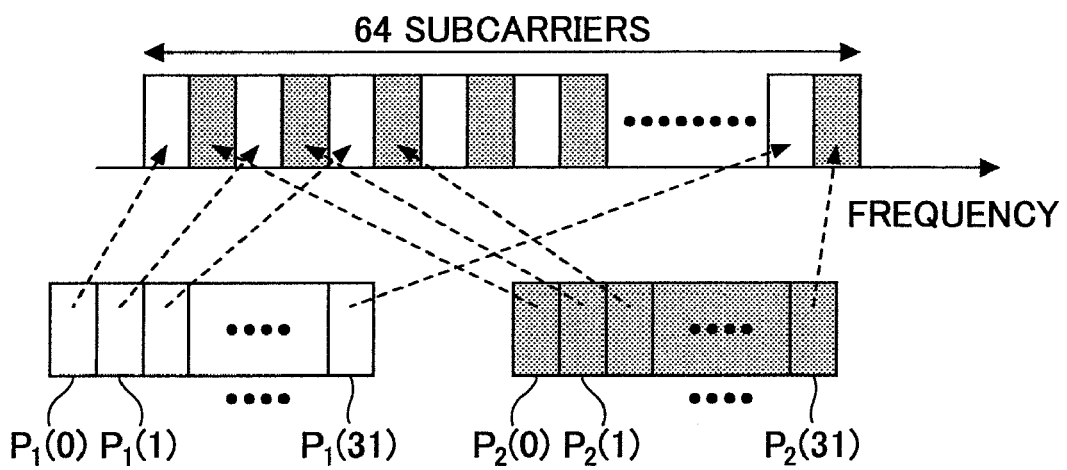
FIG. 1 is a drawing illustrating a method of mapping S-SCH sequences.
Figure 2:
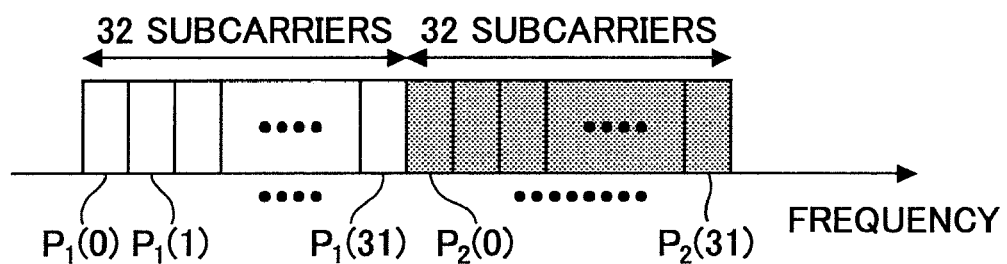
FIG. 2 is a drawing illustrating a method of mapping S-SCH sequences.

EXPLANATION OF REFERENCES $50_1, 50_2, 50_3, \ldots, 50_k$ Cell
$100_1, 100_2, 100_3, 100_n$ Mobile station
102 Basic waveform correlation unit
104 Synchronization signal replica generating unit
106 Code sequence multiplying unit
108 Upper layer code correlation unit
110 Timing detection unit
112 S-SCH detection unit
200 Base station
202 Transceiver antenna
204 Amplifier
206 Transceiver unit
208 Baseband signal processing unit
$208_1$ RLC processing unit
$208_2$ MAC processing unit
$208_3$ Encoding unit
$208_4$ Data modulation unit
$208_5$ Multiplexing unit
$208_6$ Serial-parallel converting unit
$208_7$ Multiplier
$208_8$ Multiplier
$208_9$ Scrambling code generating unit
$208_{10}$ Amplitude adjusting unit
$208_{11}$ Combining unit
$208_{12}$ Inverse Fourier transform unit
$208_{13}$ CP adding unit
$209_1$ Synchronization signal control unit
$209_2$ Synchronization signal generator
$209_3$ Data modulation unit
$209_4$ Serial-parallel converting unit
$209_5$ Multiplier
$209_6$ Amplitude adjusting unit
210 Call processing unit
212 Transmission path interface
300 Access gateway
400 Core network
1000 Radio communication system

BEST MODE FOR CARRYING OUT THE INVENTION

Embodiments of the present invention are described below with reference to the accompanying drawings. Throughout the accompanying drawings, the same reference numbers are used for parts having the same functions, and overlapping descriptions of those parts are omitted.

Figure 3:
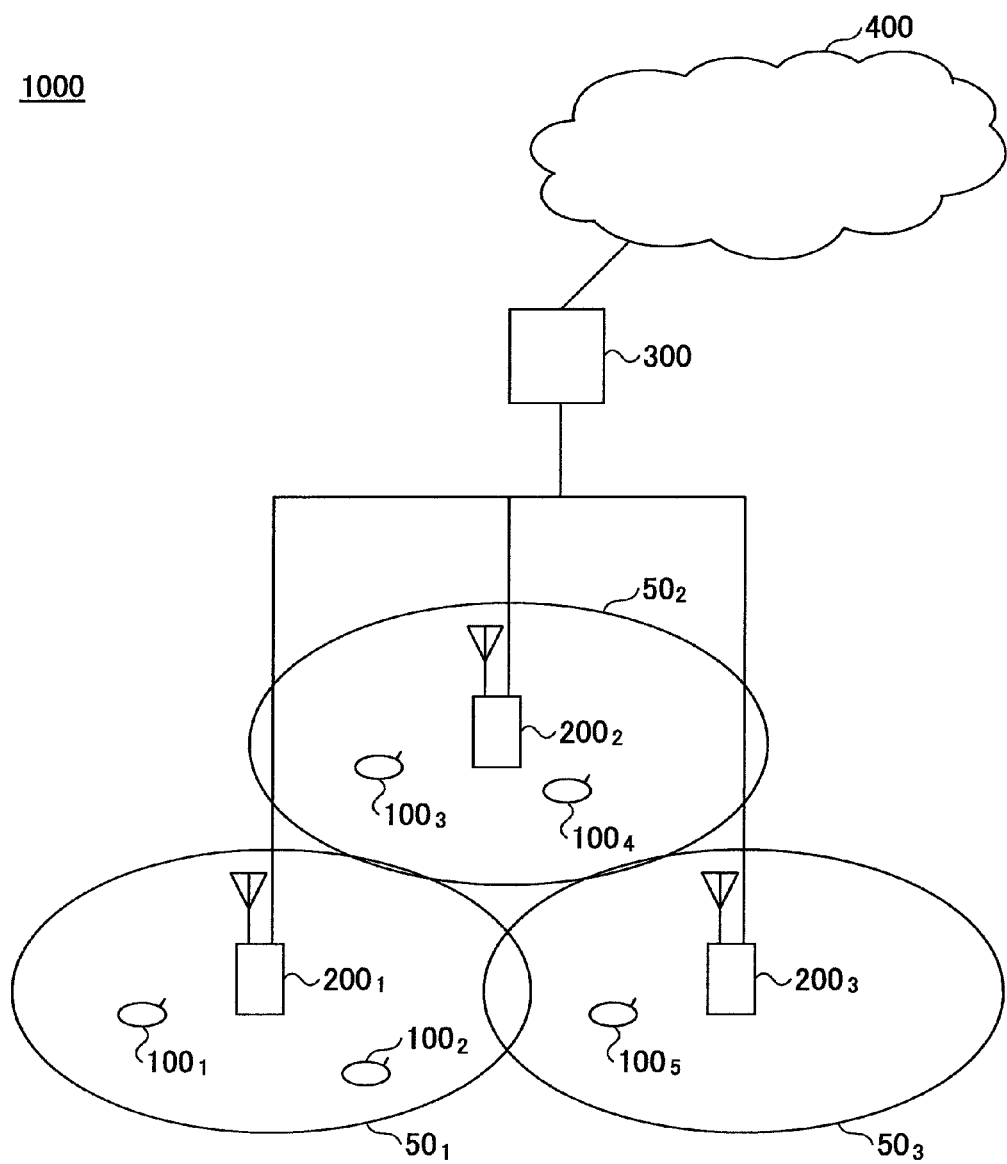
FIG. 3 is a drawing illustrating a configuration of a radio communication system according to an embodiment of the present invention.

A radio communication system 1000 including mobile stations and base stations according to an embodiment of the present invention is described below with reference to FIG. 3.

The radio communication system 1000 is based on, for example, Evolved UTRA and UTRAN (also called Long Term Evolution or Super 3G). The radio communication system 1000 includes base stations (eNode B: eNB) $200_m$ ($200_1$, $200_2$, $200_3$, $200_m$; m is an integer greater than 0) and mobile stations $100_n$ ($100_1$, $100_2$, $100_3$, ..., $100_n$; n is an integer greater than 0) that communicate with the base stations $200_m$. The base stations $200_m$ are connected to an upper node such as an access gateway 300 and the access gateway 300 is connected to a core network 400. Each of the mobile stations $100_n$ is in one of cells $50_k$ ($50_1$, $50_2$, ..., $50_k$; k is an integer greater than 0) and communicates with the corresponding one of the base stations $200_m$ according to Evolved UTRA and UTRAN.

Some of the mobile stations $100_n$ have established communication channels with the base stations $200_m$ and are in communications; and the other mobile stations $100_n$ have not established communication channels with the base stations $200_m$ and are not in communications.

Each of the base stations $200_m$ transmits synchronization signals. Each of the mobile stations $100_n$ is located in one of the cells $50_k$ ($50_1$, $50_2$, ..., $50_k$; k is an integer greater than 0). When the mobile station $100_n$ is, for example, turned on or in the intermittent reception mode during communications, the mobile station $100_n$ performs a cell search based on the synchronization signals to find a cell that provides good radio communication quality for the mobile station $100_n$. More specifically, the mobile station $100_n$ detects a symbol timing and a frame timing and detects cell-specific control information such as a cell ID (a scrambling code unique to a cell generated from the cell ID) or a group of cell IDs (hereafter called a cell ID group) based on the synchronization signals.

A cell search is performed when the mobile station $100_n$ is in communications as well as when the mobile station $100_n$ is not in communications. For example, the mobile station $100_n$ performs a cell search during communications to find a cell using the same frequency or to find a cell using a different frequency. The mobile station $100_n$ also performs a cell search when it is not in communications, for example, when the mobile station $100_n$ is turned on or in the standby mode.

The base stations $200_m$ ($200_1, 200_2, 200_3, \ldots, 200_m$) have the same configuration and functions and are therefore called the base station $200_m$ or the base stations $200_m$ in the descriptions below unless otherwise mentioned. The mobile stations $100_n$ ($100_1, 100_2, 100_3, \ldots, 100_n$) have the same configuration and functions and are therefore called the mobile station $100_n$ or the mobile stations $100_n$ in the descriptions below unless otherwise mentioned. The cells $50_k$ ($50_1, 50_2, 50_3, 50_k$) have the same configuration and functions and are therefore called the cell $50_k$ or the cells $50_k$ in the descriptions below unless otherwise mentioned.

In the radio communication system 1000, orthogonal frequency division multiplexing (OFDM) is used as the downlink radio access method and single-carrier frequency division multiple access (SC-FDMA) is used as the uplink radio access method. In OFDM, as described above, a frequency band is divided into narrow frequency bands (subcarriers) and data are transmitted on the subcarriers. In SC-FDMA, a frequency band is divided into multiple frequency bands and the frequency bands are allocated to different terminals for transmission in order to reduce interference between the terminals.

Communication channels used in Evolved UTRA and UTRAN are described below.

For downlink, a physical downlink shared channel (PD-SCH) shared by the mobile stations $100_n$ and an LTE downlink control channel are used. In downlink, the LTE downlink control channel is used to report information on mobile stations to be mapped to the physical downlink shared channel, transport format information for the physical downlink shared channel, information on mobile stations to be mapped to a physical uplink shared channel, transport format information for the physical uplink shared channel, and acknowledgement information for the physical uplink shared channel; and the physical downlink shared channel is used to transmit user data.

Also in downlink, the base stations $200_m$ transmit synchronization signals used by the mobile stations $100_n$ to perform cell searches.

For uplink, the physical uplink shared channel (PUSCH) shared by the mobile stations $100_n$ and an LTE uplink control channel are used. There are two types of uplink control channel: an uplink control channel to be time-division-multiplexed with the physical uplink shared channel and an uplink control channel to be frequency-division-multiplexed with the physical uplink shared channel.

In uplink, the LTE uplink control channel is used to report downlink channel quality indicators (CQI) used for scheduling and adaptive modulation and coding (AMC) of the physical downlink shared channel and to transmit acknowledgement information (HARQ ACK information) for the physical downlink shared channel; and the physical uplink shared channel is used to transmit user data.

Figure 4:
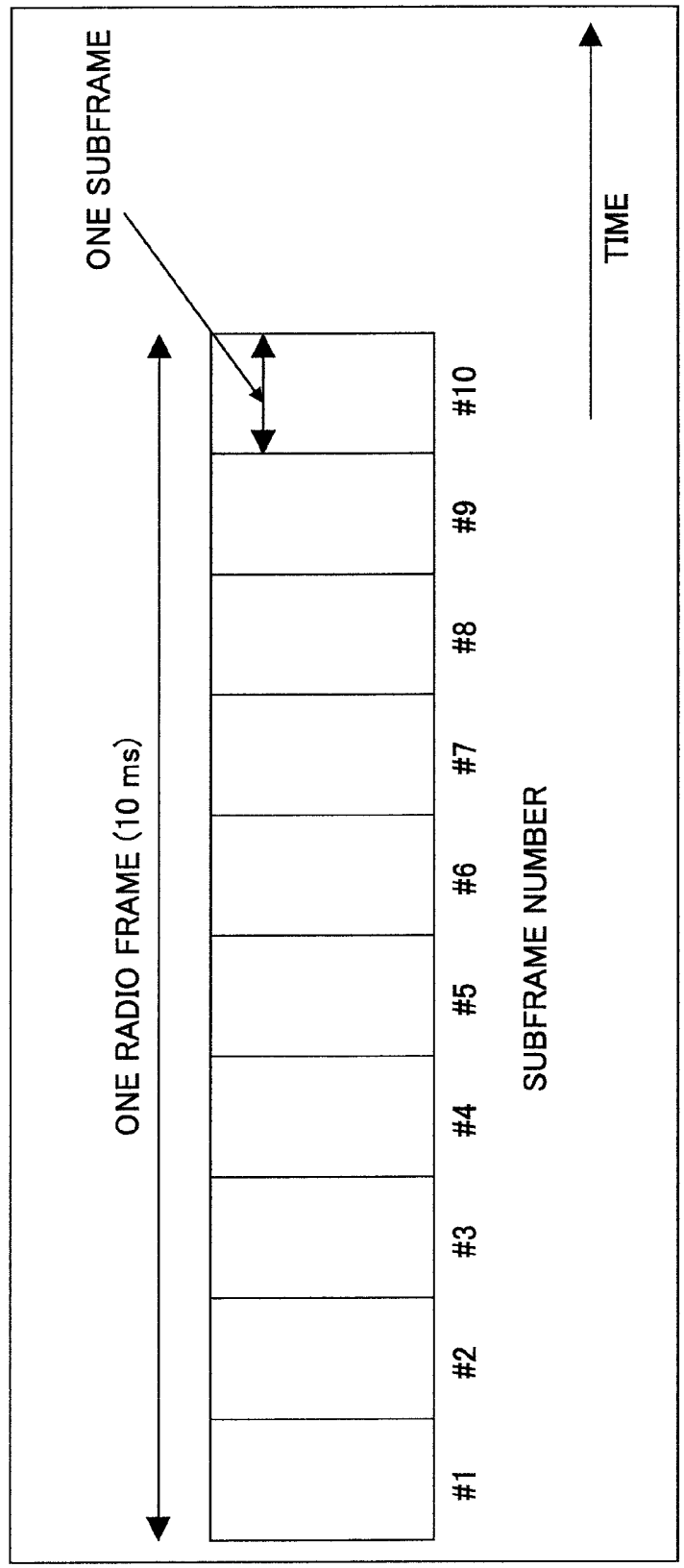
FIG. 4 is a drawing illustrating a radio frame structure.
Figure 5:
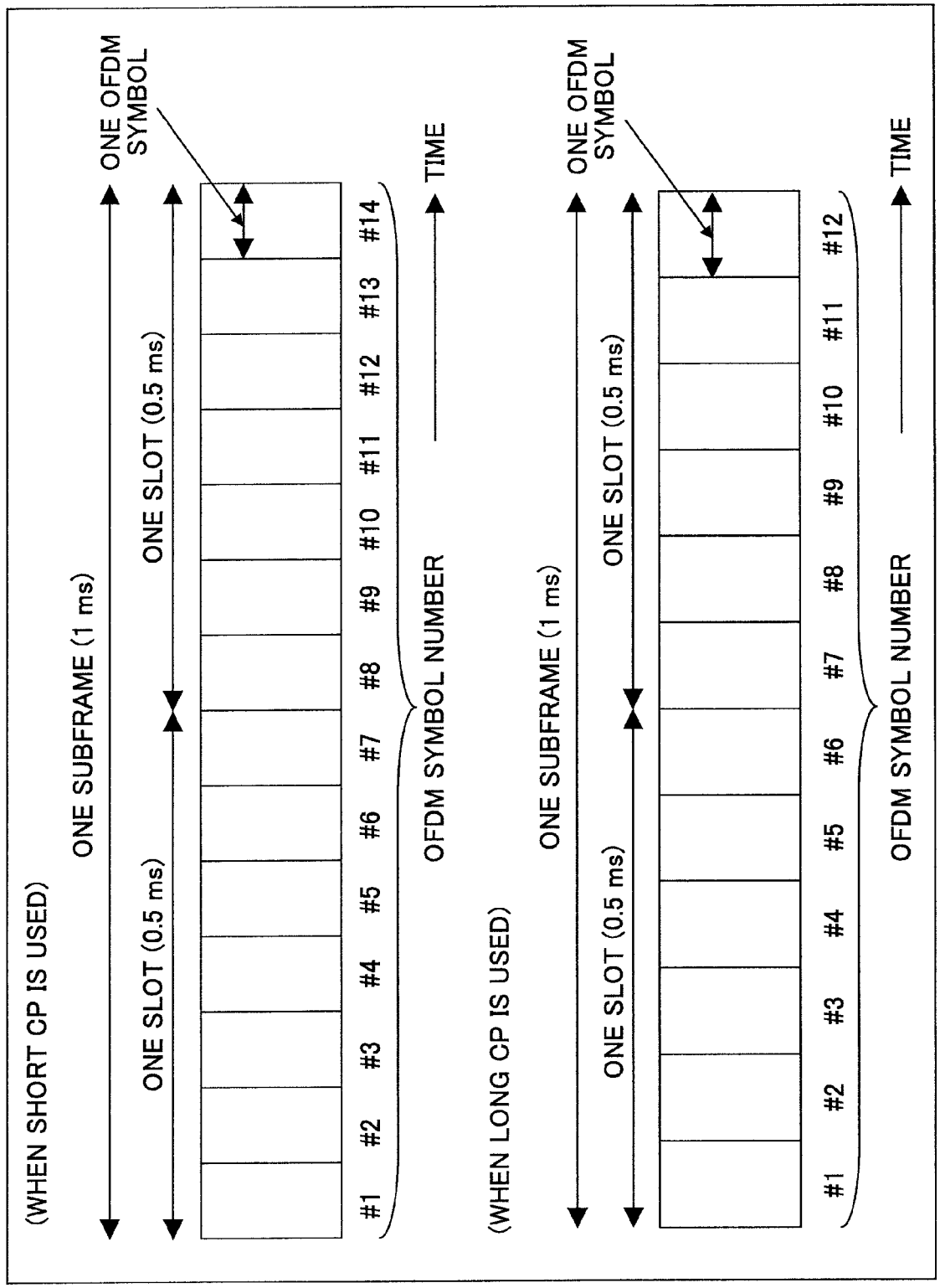
FIG. 5 is a drawing illustrating subframe structures.

In downlink transmission, as shown in FIG. 4, one radio frame is 10 ms and includes 10 subframes. Also, as shown in FIG. 5, one subframe includes two slots, and one slot includes seven OFDM symbols when short CPs are used or six OFDM symbols when long CPs are used.

Figure 6:
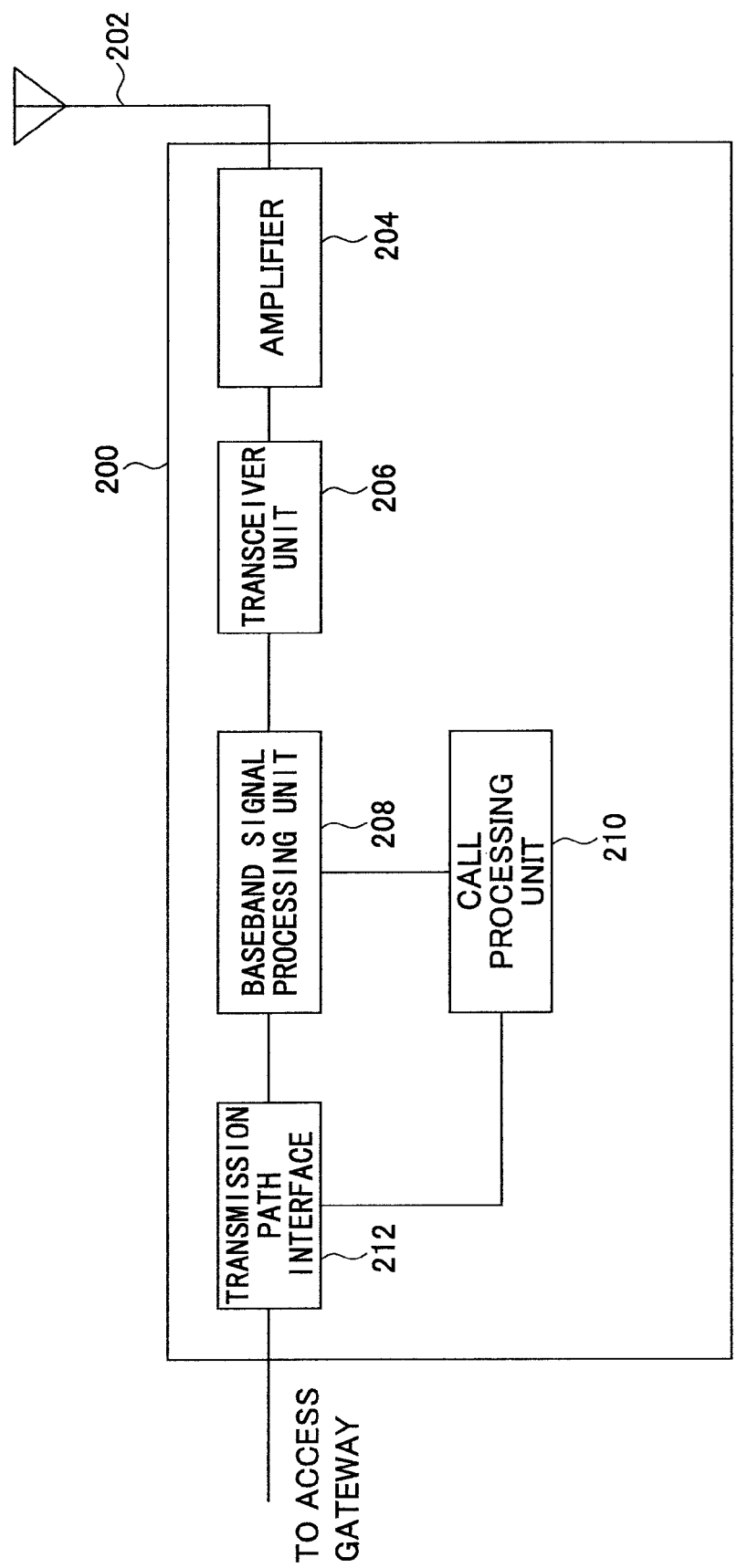
FIG. 6 is a partial block diagram of a base station according to an embodiment of the present invention.

Next, the base station $200_m$ according to an embodiment of the present invention is described with reference to FIG. 6.

The base station $200_m$ of this embodiment includes a transceiver antenna 202, an amplifier 204, a transceiver unit 206, a baseband signal processing unit 208, a call processing unit 210, and a transmission path interface 212.

Downlink packet data to be transmitted from the base station $200_m$ to the mobile station $100_n$ are sent from an upper node such as the access gateway 300 to the base station $200_m$ and input to the baseband signal processing unit 208 via the transmission path interface 212.

The baseband signal processing unit 208 performs, for the packet data, RLC layer transmission processing such as segmentation/concatenation and a transmission process in radio link control (RLC) retransmission control; a transmission process in MAC retransmission control (e.g., hybrid automatic repeat request (HARQ)); scheduling; selection of transport formats; channel coding; and inverse fast Fourier transform (IFFT) processing. Then, the baseband signal processing unit 208 sends the packet data to the transceiver unit 206. Also, as described later, the baseband signal processing unit 208 generates synchronization signals. The generated synchronization signals are multiplexed with the packet data and sent to the transceiver unit 206.

The transceiver unit 206 performs frequency conversion to convert a baseband signal output from the baseband signal processing unit 208 into a radio frequency signal. The radio frequency signal is amplified by the amplifier 204 and transmitted from the transceiver antenna 202. Here, the baseband signal indicates the packet data and the synchronization signals described above.

Meanwhile, when a radio frequency signal including uplink data is transmitted from the mobile station $100_n$ to the base station $200_m$, the radio frequency signal is received by the transceiver antenna 202, is amplified by the amplifier 204, and is frequency-converted by the transceiver unit 206 into a baseband signal. Then, the transceiver unit 206 inputs the baseband signal to the baseband signal processing unit 208.

The baseband signal processing unit 208 performs FFT processing, error correction decoding, a reception process in MAC retransmission control, and RLC layer reception processing on the input baseband signal and transmits the baseband signal via the transmission path interface 212 to the access gateway 300.

The call processing unit 210 performs status management and resource allocation for the base station $200_m$.

Figure 7:
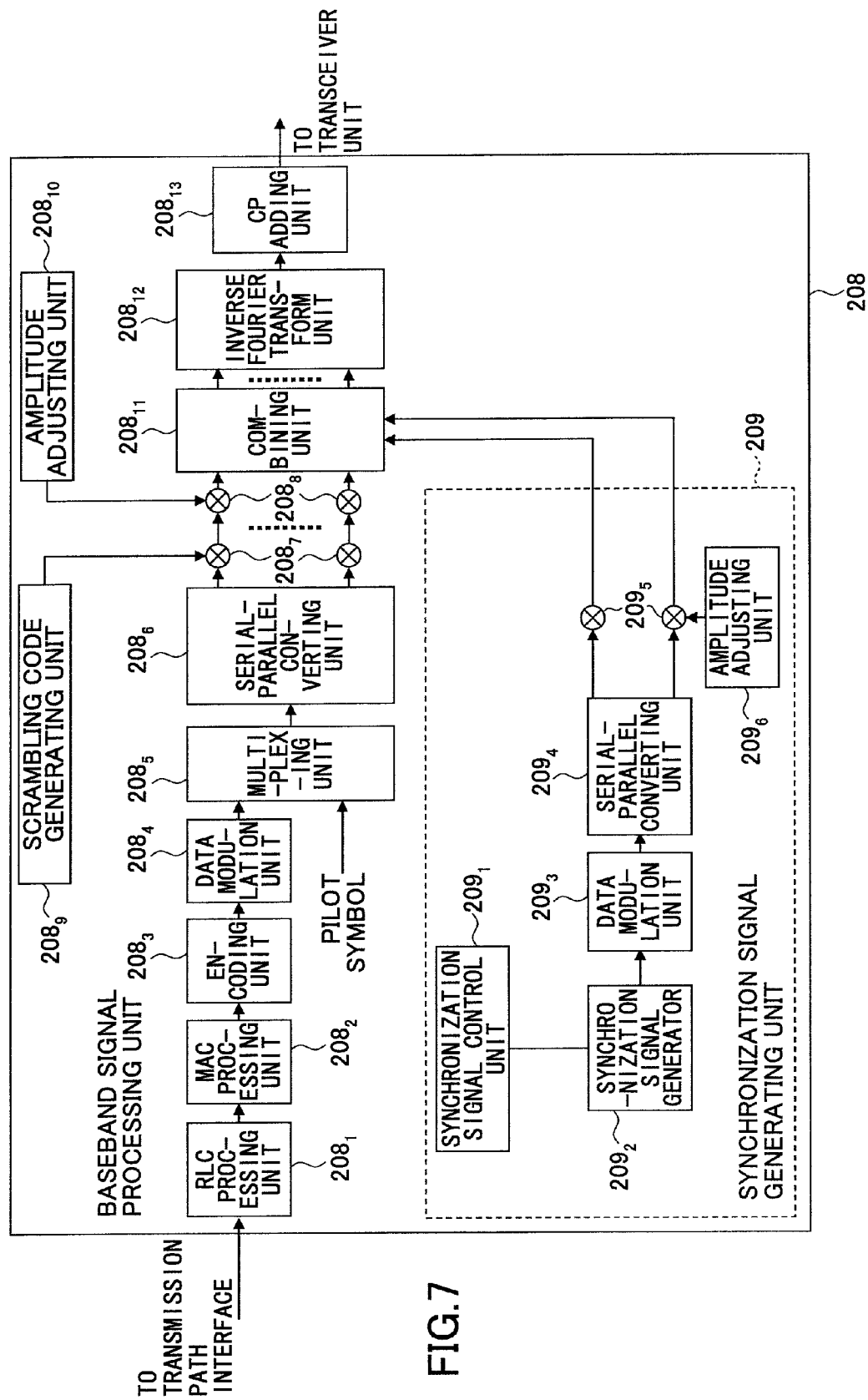
FIG. 7 is a block diagram of a baseband signal processing unit of a base station according to an embodiment of the present invention.

Next, a configuration of the baseband signal processing unit 208 is described with reference to FIG. 7. Embodiments of the present invention mainly relate to downlink. Therefore, only components related to downlink processing are shown in FIG. 7 and components related to uplink processing are omitted.

The baseband signal processing unit 208 includes an RLC processing unit $208_1$, a medium access control (MAC) processing unit $208_2$, an encoding unit $208_3$, a data modulation unit $208_4$, a multiplexing unit $208_5$, a serial-parallel converting unit $208_6$, multipliers $208_7$, multipliers $208_8$, a scrambling code generating unit $208_9$, an amplitude adjusting unit $208_{10}$, a combining unit $208_{11}$, an IFFT (IDFT) $208_{12}$, a CP adding unit $208_{13}$, and a synchronization signal generating unit 209.

The RLC processing unit $208_1$ performs RLC layer transmission processing such as segmentation/concatenation and a transmission process in RLC retransmission control on a transmission data sequence of downlink packet data received from the transmission path interface 212. The MAC processing unit $208_2$ performs MAC-layer transmission processing such as a transmission process in hybrid automatic repeat request (HARQ), scheduling, selection of transport formats, and allocation of frequency resources on the transmission data sequence of the downlink packet data. Then, the encoding unit $208_3$ encodes the transmission data sequence and the data modulation unit $208_4$ data-modulates the encoded transmission data sequence. The multiplexing unit $208_5$ multiplexes the data-modulated transmission data sequence with a pilot symbol, and the serial-parallel converting unit $208_6$ converts the transmission data sequence multiplexed with the pilot symbol into a symbol sequence with N information symbols by serial-parallel conversion such that the N information symbols are arranged along the frequency axis. Here, the pilot symbol is, for example, a downlink reference signal. The respective multipliers $208_7$ (the number of which is N) multiply the N information symbols arranged along the frequency axis in the frequency direction by a scrambling code output from the scrambling code generating unit $208_9$. Also, the respective multipliers $208_8$ (the number of which is N) multiply the N information symbols multiplied by the scrambling code by an amplitude adjusting sequence value output from the amplitude adjusting unit $208_{10}$ and output the multiplied symbols (symbol sequence) to the combining unit $208_{11}$. The combining unit $208_{11}$ multiplexes the symbol sequence having a sequence length N and multiplied by the scrambling code and the amplitude adjusting sequence value with synchronization signals generated by the synchronization signal generating unit 209 in one or more of N subcarriers.

As described later, subframes and slots used to transmit the synchronization signals are determined by a synchronization signal control unit $209_1$. In the slots of the subframes used to transmit the synchronization signals, the synchronization signals generated by the synchronization signal generating unit 209 are multiplexed with a symbol sequence of downlink packet data that has a sequence length N and is multiplied by a scrambling code and an amplitude adjusting sequence value. Meanwhile, in slots of subframes that are not used to transmit the synchronization signals, the synchronization signals generated by the synchronization signal generating unit 209 are not multiplexed and only a symbol sequence of downlink packet data having a sequence length N and multiplied by a scrambling code and an amplitude adjusting sequence value is sent to the inverse Fourier transform unit $208_{12}$. The subcarrier where the synchronization signals are multiplexed is located, for example, in the center of the entire frequency band. Also, the bandwidth of the subcarrier where the synchronization signals are multiplexed is, for example, 1.25 MHz.

The inverse Fourier transform unit (IFFT) $208_{12}$ converts the N symbols into an orthogonal multi-carrier signal. The CP adding unit $208_{13}$ inserts a CP into the multi-carrier signal at every Fourier transform time. There are two types of CPs with different lengths (CP lengths): a long CP and a short CP. Either one of the long CP and the short CP is selected for each cell.

A synchronization signal generation process of the synchronization signal generating unit 209 is described below. The synchronization signals include a first synchronization signal (hereafter called P-SCH) and a second synchronization signal (hereafter called S-SCH). The synchronization signal generating unit 209 includes a synchronization signal control unit $209_1$, a synchronization signal generator $209_2$, a data modulation unit $209_3$, a serial-parallel converting unit $209_4$, multipliers $209_5$, and an amplitude adjusting unit $209_6$. The synchronization signal control unit $209_1$ is connected to the synchronization signal generator $209_2$.

The synchronization signal control unit $209_1$ determines a sequence used for the P-SCH (P-SCH sequence) and subframes and slots used to transmit the P-SCH and the S-SCH based on the cell ID or the cell ID group of a cell where the base station $200_m$ provides communications based on Evolved UTRA and UTRAN. The mobile station may be configured to identify a cell based on a signal pattern of a pilot signal, i.e., a reference signal, after identifying a cell ID group. In this case, for example, the correspondence between signal patterns of the reference signal and cell IDs is predefined. Alternatively, the mobile station may be configured to identify a cell based on demodulation and decoding results of the P-SCH and the S-SCH. In this case, for example, the correspondence between P-SCH sequences and cell ID information is predefined.

The synchronization signal control unit $209_1$ reports a number indicating the P-SCH sequence (P-SCH sequence number) as synchronization signal sequence information to the synchronization signal generator $209_2$. The synchronization signal control unit $209_1$ also reports numbers indicating the subframes and the slots (subframe numbers and slot numbers) used to transmit the P-SCH and the S-SCH as synchronization signal transmission timing information to the synchronization signal generator $209_2$.

Figure 8:
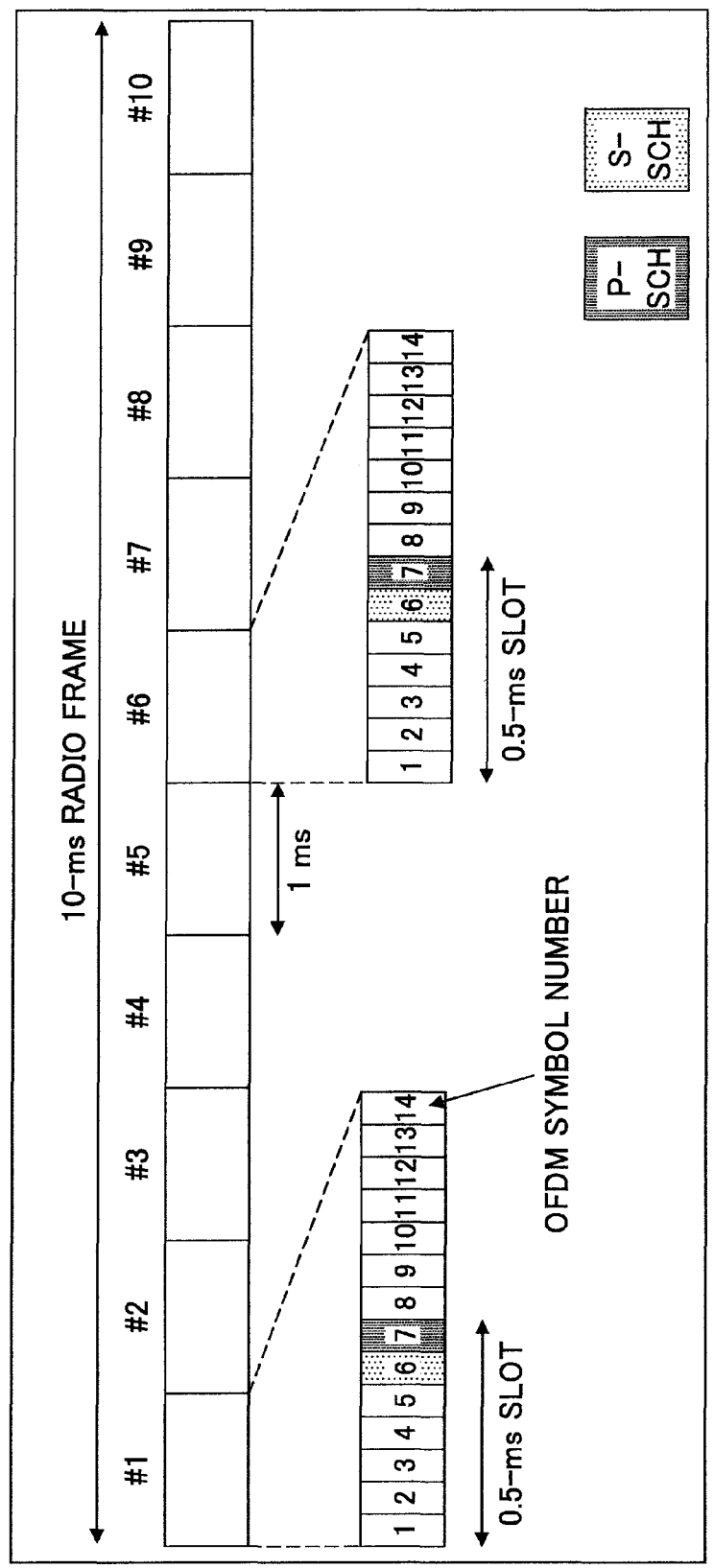
FIG. 8 is a drawing illustrating an exemplary synchronization signal transmission pattern.

For example, in the radio communication system 1000, subframes and slots used to transmit the P-SCH and the S-SCH are defined as described in 3GPP TS 36.211 V1.0.0 (2007-03) and shown in FIG. 8. In this example, multiple types of P-SCH sequences are used and the synchronization signals are transmitted in subframe #1 and subframe #6. Also in this example, the P-SCH is mapped to the last OFDM symbol of each selected slot. This configuration enables the mobile station to demodulate the P-SCH regardless of whether the long CP or the short CP is used. This is because the timing of the sixth OFDM symbol that is the last OFDM symbol in a slot where the long CP is used matches the timing of the seventh OFDM symbol that is the last OFDM symbol in a slot where the short CP is used. In other words, the timings of the first and last symbols in a subframe where the long CP is used and those in a subframe where the short CP is used are the same. In this case, the correspondence between P-SCH sequence numbers and cell ID information may be predefined in the radio communication system 1000. With the correspondence between P-SCH sequence numbers and cell ID information predefined in the radio communication system 1000, the synchronization signal control unit $209_1$ of the base station $200_m$ can determine a P-SCH sequence based on the cell ID of a cell where the base station $200_m$ provides communications based on Evolved UTRA and UTRAN.

Figure 9:
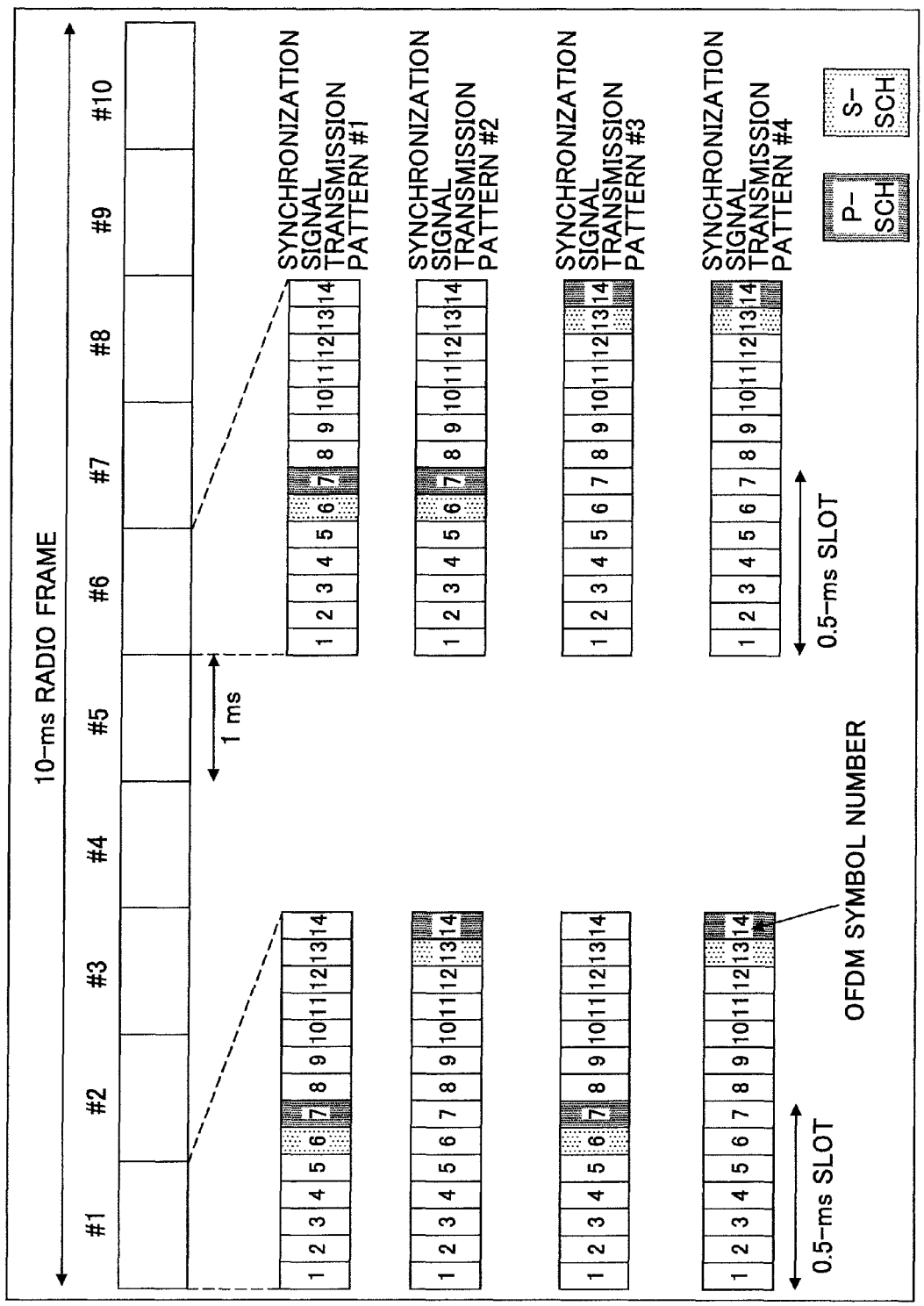
FIG. 9 is a drawing illustrating exemplary synchronization signal transmission patterns.

Alternatively, combinations of subframes and slots used to transmit the P-SCH and the S-SCH may be predefined as synchronization signal transmission patterns in the radio communication system 1000. In FIG. 9, four synchronization signal transmission patterns #1, #2, #3, and #4 are defined. In this example, the synchronization signals are transmitted at regular intervals in subframe #1 and subframe #6. This configuration makes it easier for the mobile terminal to obtain an average of multiple frames. Also in this example, the P-SCH is mapped to the last OFDM symbols of subframes. This configuration enables the mobile station to demodulate the P-SCH regardless of whether the long CP or the short CP is used.

In the radio communication system 1000 configured as described above, eight combinations of four P-SCH sequences and two synchronization signal transmission patterns may be defined as shown in FIG. 10. The combinations of the P-SCH sequences and the synchronization signal transmission patterns may be associated with cell IDs or cell ID groups such that use of the same combination of a P-SCH sequence and a synchronization signal transmission pattern in adjacent cells is prevented. With the association information, the synchronization signal control unit $209_1$ of the base station $200_m$ can determine a P-SCH sequence and subframes and slots used to transmit the P-SCH and the S-SCH based on the cell ID or the cell ID group of a cell where the base station $200_m$ provides communications based on Evolved UTRA and UTRAN. In this case, the S-SCH may include an information item indicating which one of synchronization signal transmission patterns #1 and #4 is used to transmit the synchronization signals, i.e., the P-SCH and the S-SCH. This configuration enables the mobile station to determine which one of synchronization signal transmission patterns #1 and #4" is used to transmit the synchronization signals based on the information item included in the S-SCH.

With the combinations defined in FIG. 10, P-SCHs based on different combinations are transmitted at different timings (do not collide with each other) or use different P-SCH sequences. Thus, using the combinations as defined in FIG. 10 makes it possible to prevent characteristic degradation of S-SCHs.

As another example, in the radio communication system 1000, eight combinations of four P-SCH sequences and two synchronization signal transmission patterns may be defined as shown in FIG. 11. The combinations of the P-SCH sequences and the synchronization signal transmission patterns may be associated with cell IDs or cell ID groups such that use of the same combination of a P-SCH sequence and a synchronization signal transmission pattern in adjacent cells is prevented. With the association information, the synchronization signal control unit $209_1$ of the base station $200_m$ can determine a P-SCH sequence and subframes and slots used to transmit the P-SCH and the S-SCH based on the cell ID or the cell ID group of a cell where the base station $200_m$ provides communications based on Evolved UTRA and UTRAN. In this case, the S-SCH does not have to include an information item indicating which one of synchronization signal transmission patterns #2 and #3 is used to transmit the synchronization signals, i.e., the P-SCH and the S-SCH. This is because the mobile station can determine which one of synchronization signal transmission patterns #2 and #3 is used to transmit the synchronization signals based on the time interval between received P-SCHs. With the combinations defined in FIG. 11, P-SCHs based on different combinations are transmitted at different timings or use different P-SCH sequences. Thus, using the combinations as defined in FIG. 11 makes it possible to prevent characteristic degradation of S-SCHs.

As another example, in the radio communication system 1000, nine combinations of three P-SCH sequences and three synchronization signal transmission patterns may be defined as shown in FIG. 12. The combinations of the P-SCH sequences and the synchronization signal transmission patterns may be associated with cell IDs or cell ID groups such that use of the same combination of a P-SCH sequence and a synchronization signal transmission pattern in adjacent cells is prevented. With the association information, the synchronization signal control unit $209_1$ of the base station $200_m$ can determine a P-SCH sequence and subframes and slots used to transmit the P-SCH and the S-SCH based on the cell ID or the cell ID group of a cell where the base station $200_m$ provides communications based on Evolved UTRA and UTRAN. In this case, the S-SCH does not have to include an information item indicating which one of synchronization signal transmission patterns #1, #2, and #3 is used to transmit the synchronization signals, i.e., the P-SCH and the S-SCH. This is because the mobile station can determine which one of synchronization signal transmission patterns #1, #2, and #3 is used to transmit the synchronization signals based on the time interval between received P-SCHs. With the combinations defined in FIG. 12, even when different combinations are used, P-SCHs may be transmitted at the same timing in some cases. Still, in other cases, P-SCHs based on different combinations are transmitted at different timings. Therefore, using the combinations as defined in FIG. 12 makes it possible to prevent characteristic degradation of S-SCHs to a certain extent. Meanwhile, in FIG. 12, only three P-SCH sequences are used to define nine combinations of P-SCH sequences and synchronization signal transmission patterns. Accordingly, using the combinations as defined in FIG. 12 makes it possible to reduce the processing load of the mobile terminal. Also, defining the combinations as shown in FIG. 12 makes it possible to more flexibly associate cell IDs or cell ID groups with the combinations of P-SCH sequences and synchronization signal transmission patterns. For example, only combinations #2, #3, #5, #6, #8, and #9 may be associated with cells where prevention of characteristic degradation of S-SCHs is highly desired. Combinations #2, #3, #5, #6, #8, and #9 used in this case correspond to the combinations defined in FIG. 11 and therefore P-SCHs are transmitted at different timings. Thus, using combinations #2, #3, #5, #6, #8, and #9 makes it possible to effectively prevent characteristic degradation of S-SCHs. Meanwhile, all combinations #1-#9 may be used for cells where characteristic degradation of S-SCHs is acceptable to some extent. This in turn makes it easier to associate cell IDs or cell ID groups with the combinations.

In FIG. 12, synchronization signal transmission patterns #2, #3, and #4 may be used instead of synchronization signal transmission patterns #1, #2, and #3.

As still another example, in the radio communication system 1000, eight combinations of two P-SCH sequences and four synchronization signal transmission patterns may be defined as shown in FIG. 13. The combinations of the P-SCH sequences and the synchronization signal transmission patterns may be associated with cell IDs or cell ID groups such that use of the same combination of a P-SCH sequence and a synchronization signal transmission pattern in adjacent cells is prevented. With the association information, the synchronization signal control unit $209_1$ of the base station $200_m$ can determine a P-SCH sequence and subframes and slots used to transmit the P-SCH and the S-SCH based on the cell ID or the cell ID group of a cell where the base station $200_m$ provides communications based on Evolved UTRA and UTRAN. In this case, the S-SCH may include an information item indicating which one of synchronization signal transmission patterns #1, #2, #3, and #4 is used to transmit the synchronization signals, i.e., the P-SCH and the S-SCH. This configuration enables the mobile station to determine which one of synchronization signal transmission patterns #1, #2, #3, and #4 is used to transmit the synchronization signals based on the information item included in the S-SCH. With the combinations defined in FIG. 13, even when different combinations are used, P-SCHs may be transmitted at the same timing in some cases. Still, in other cases, P-SCHs based on different combinations are transmitted at different timings. Therefore, using the combinations as defined in FIG. 13 makes it possible to prevent characteristic degradation of S-SCHs to a certain extent. Meanwhile, in FIG. 13, only two P-SCH sequences are used to define eight combinations of P-SCH sequences and synchronization signal transmission patterns. Accordingly, using the combinations as defined in FIG. 13 makes it possible to reduce the processing load of the mobile terminal.

Also, defining the combinations as shown in FIG. 13 makes it possible to more flexibly associate cell IDs or cell ID groups with the combinations of P-SCH sequences and synchronization signal transmission patterns. For example, only combinations #1, #4, #5, and #8 may be associated with cells where prevention of characteristic degradation of S-SCHs is highly desired. Combinations #1, #4, #5, and #8 used in this case correspond to the combinations defined in FIG. 10 and therefore P-SCHs are transmitted at different timings. Thus, using combinations #1, #4, #5, and #8 makes it possible to effectively prevent characteristic degradation of S-SCHs. Meanwhile, all combinations #1-#8 may be used for cells where characteristic degradation of S-SCHs is accepted to some extent. This in turn makes it easier to associate cell IDs or cell ID groups with the combinations.

In FIG. 9 described above, the P-SCH and the S-SCH are transmitted in subframes #1 and #6. Alternatively, the P-SCH and the S-SCH may be transmitted in subframes #1 and #5. In this case, the synchronization signals are transmitted at different intervals. This method enables the mobile station to easily detect the boundary between radio frames based on transmission intervals of the P-SCH. Also in the case where the P-SCH and the S-SCH are transmitted in subframes #1 and #5 instead of subframes #1 and #6, synchronization signal transmission patterns #1, #2, #3, and #4 are defined, combinations of P-SCH sequences and synchronization signal transmission patterns are defined as shown in any one of FIGS. 10, 11, 12, and 13, and the combinations are associated with cell IDs or cell ID groups.

Figure 14:
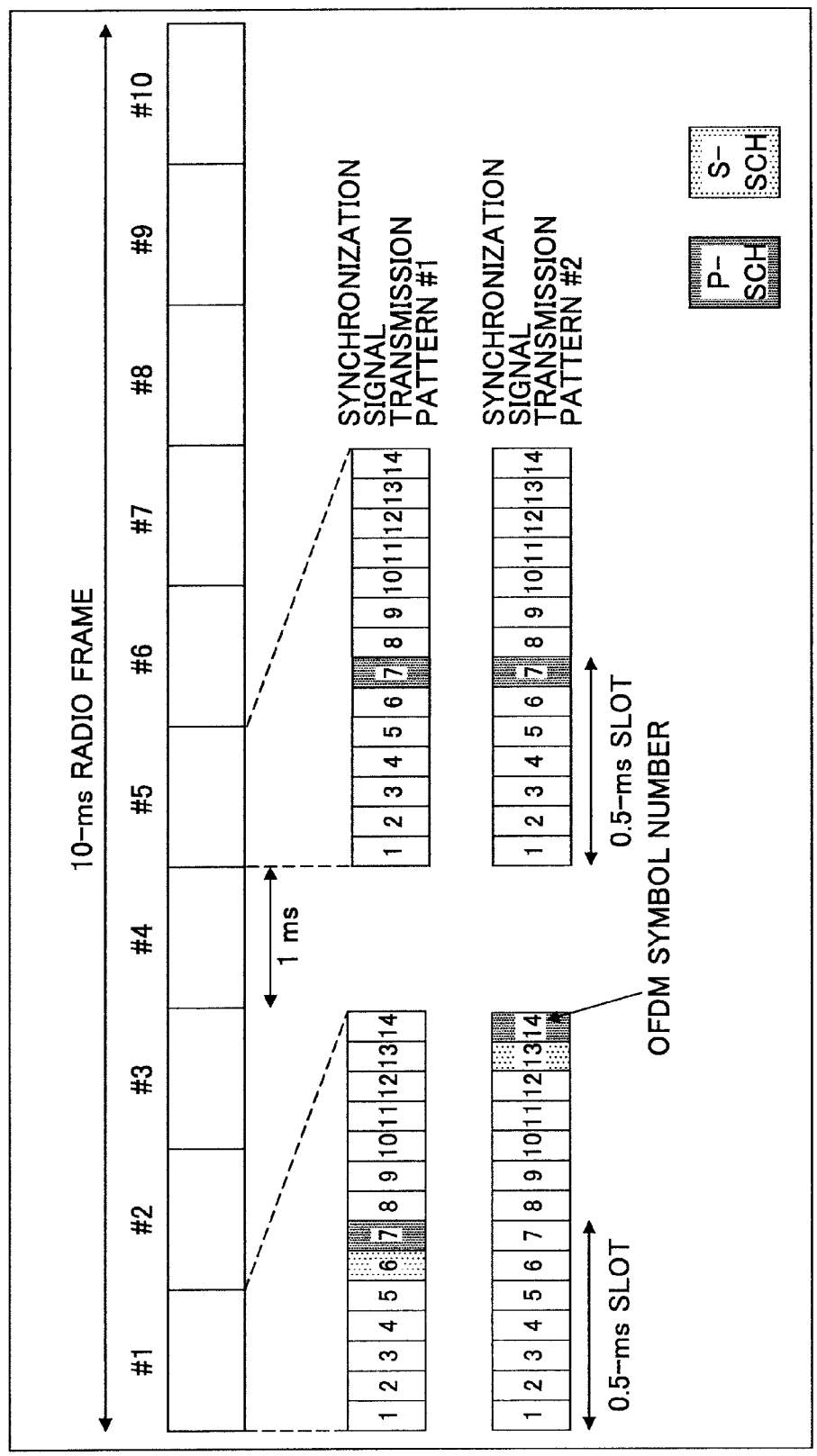
FIG. 14 is a drawing illustrating exemplary synchronization signal transmission patterns.

As another exemplary configuration of the radio communication system 1000, two combinations of subframes and slots used to transmit the P-SCH and the S-SCH may be predefined as synchronization signal transmission patterns #1 and #2 as shown in FIG. 14. With this configuration, the synchronization signals are transmitted in subframe #1 and subframe #5, i.e., at different intervals. Therefore, this configuration enables the mobile station to easily detect the boundary between radio frames. Also with this configuration, the P-SCH is mapped to the last OFDM symbol of each defined slot. This in turn enables the mobile station to demodulate the P-SCH regardless of whether the long CP or the short CP is used. This is because the timing of the sixth OFDM symbol that is the last OFDM symbol in a slot where the long CP is used matches the timing of the seventh OFDM symbol that is the last OFDM symbol in a slot where the short CP is used. With synchronization signal transmission patterns #1 and #2 shown in FIG. 14, the S-SCH is transmitted only in subframe #1 in each radio frame and is not transmitted in subframe #5. Since the P-SCH is transmitted at different intervals, the mobile station can easily detect the boundary between radio frames and thereby demodulate the S-SCH only in subframe #1. Also, in subframe #1, different OFDM symbols are used in synchronization signal transmission patterns #1 and #2 to transmit the P-SCH and the S-SCH. Therefore, this configuration allows P-SCHs to be transmitted at different timings (so as not to collide with each other) in subframe #1 and thereby makes it possible to prevent characteristic degradation of S-SCHs.

In the radio communication system 1000 configured as described above, eight combinations of four P-SCH sequences and two synchronization signal transmission patterns may be defined as shown in FIG. 15. The combinations of the P-SCH sequences and the synchronization signal transmission patterns may be associated with cell IDs or cell ID groups such that use of the same combination of a P-SCH sequence and a synchronization signal transmission pattern in adjacent cells is prevented. With the association information, the synchronization signal control unit $209_1$ of the base station $200_m$ can determine a P-SCH sequence and subframes and slots used to transmit the P-SCH and the S-SCH based on the cell ID or the cell ID group of a cell where the base station $200_m$ provides communications based on Evolved UTRA and UTRAN. In this case, the S-SCH does not have to include an information item indicating which one of synchronization signal transmission patterns #1 and #2 is used to transmit the synchronization signals, i.e., the P-SCH and the S-SCH. This is because the mobile station can determine which one of synchronization signal transmission patterns #1 and #2 is used to transmit the synchronization signals based on the time interval between received P-SCHs.

Figure 16:
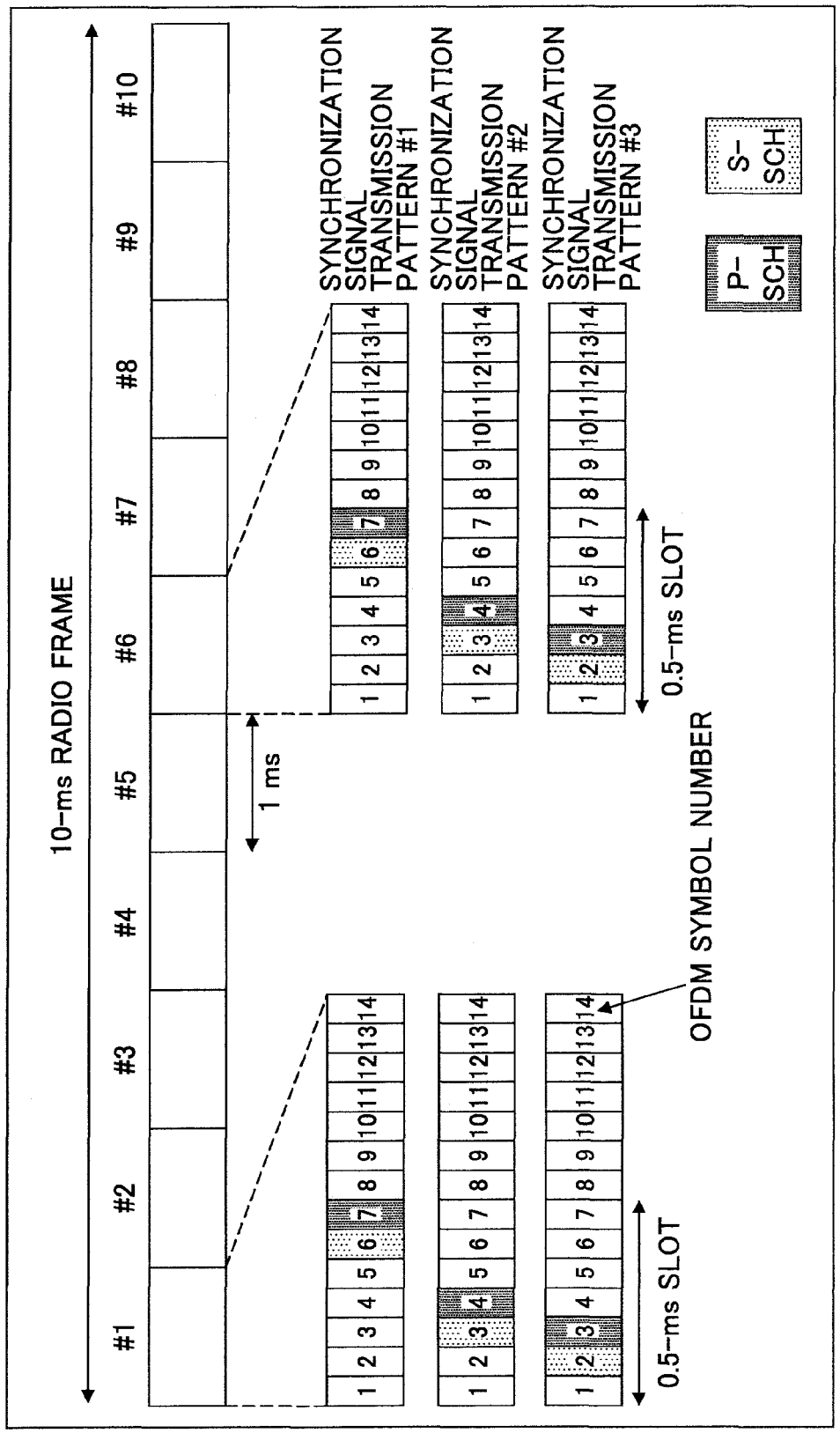
FIG. 16 is a drawing illustrating exemplary synchronization signal transmission patterns.

As another exemplary configuration of the radio communication system 1000, three combinations of subframes and slots used to transmit the P-SCH and the S-SCH may be predefined as synchronization signal transmission patterns #1, #2, and #3 as shown in FIG. 16. In this example, the synchronization signals are transmitted at regular intervals in subframe #1 and subframe #6. This configuration makes it easier for the mobile terminal to obtain an average of multiple frames. Also, transmission timings of P-SCHs based on different ones of synchronization signal transmission patterns #1, #2, and #3 become different.

In the radio communication system 1000 as described above, nine combinations of three P-SCH sequences and three synchronization signal transmission patterns may be defined as shown in FIG. 17. The combinations of the P-SCH sequences and the synchronization signal transmission patterns may be associated with cell IDs or cell ID groups such that use of the same combination of a P-SCH sequence and a synchronization signal transmission pattern in adjacent cells is prevented. With the association information, the synchronization signal control unit $209_1$ of the base station $200_m$ can determine a P-SCH sequence and subframes and slots used to transmit the P-SCH and the S-SCH based on the cell ID or the cell ID group of a cell where the base station $200_m$ provides communications based on Evolved UTRA and UTRAN. In this case, the S-SCH may include an information item indicating which one of synchronization signal transmission patterns #1, #2, and #3 is used to transmit the synchronization signals, i.e., the P-SCH and the S-SCH. This configuration enables the mobile station to determine which one of synchronization signal transmission patterns #1, #2, and #3 is used to transmit the synchronization signals based on the information item included in the S-SCH.

With the combinations defined in FIG. 17, P-SCHs based on different combinations are transmitted at different timings or use different P-SCH sequences. Thus, using the combinations as defined in FIG. 17 makes it possible to prevent characteristic degradation of S-SCHs.

Figure 18:
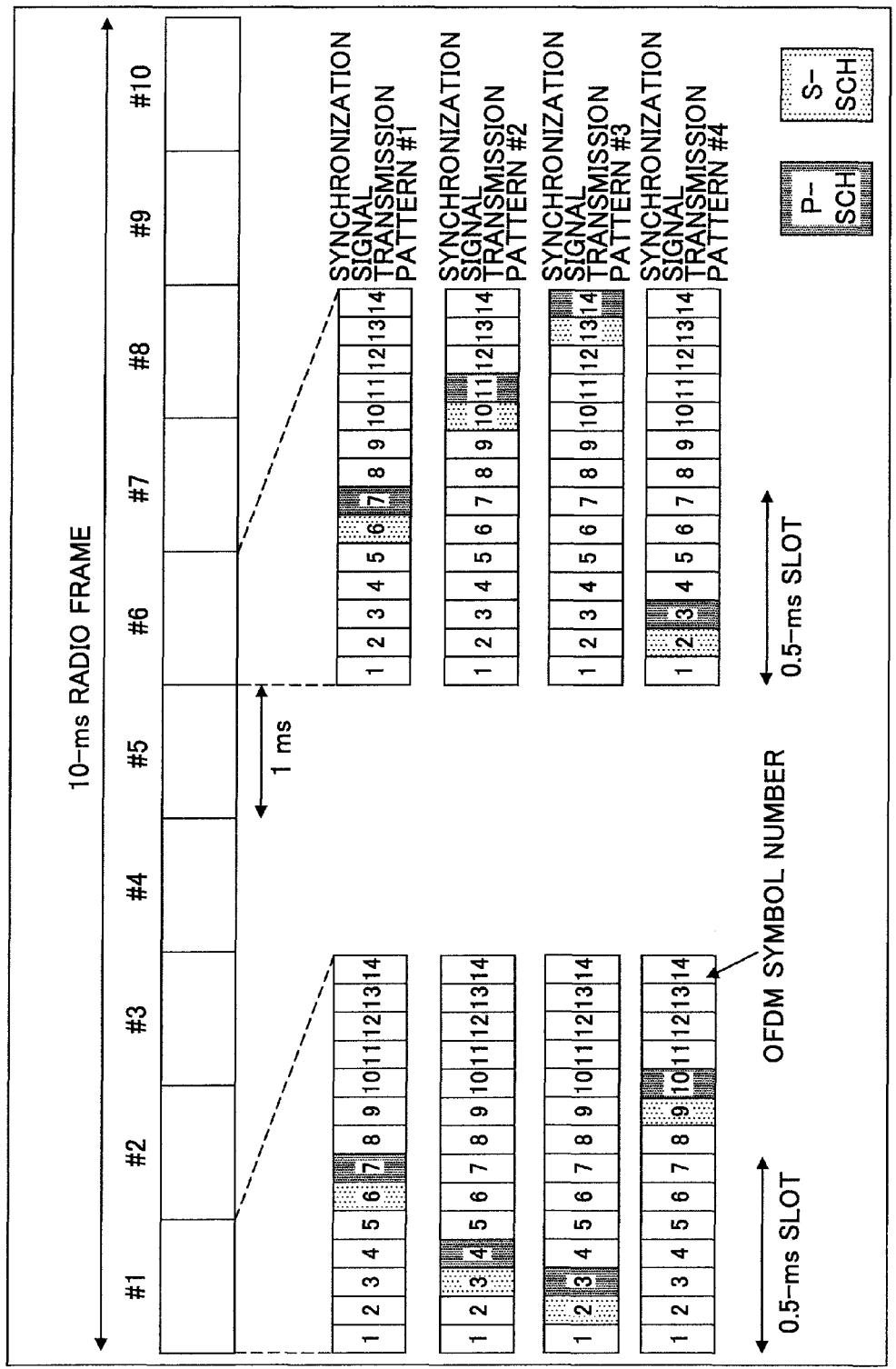
FIG. 18 is a drawing illustrating exemplary synchronization signal transmission patterns.

As still another exemplary configuration of the radio communication system 1000, four combinations of subframes and slots used to transmit the P-SCH and the S-SCH may be predefined as synchronization signal transmission patterns #1, #2, #3, and #4 as shown in FIG. 18. With this configuration, the synchronization signals are transmitted at regular intervals in subframe #1 and subframe #6. Therefore, this configuration makes it easier for the mobile terminal to obtain an average of multiple frames. Also, transmission timings of P-SCHs based on different ones of synchronization signal transmission patterns #1, #2, #3, and #4 become different. In the synchronization signal transmission patterns shown in FIG. 16, OFDM symbols to which the P-SCH and the S-SCH are to be mapped are arranged within one slot. On the other hand, in the synchronization signal transmission patterns shown in FIG. 18, OFDM symbols to which the P-SCH and the S-SCH are to be mapped are arranged across two slots, i.e., within one subframe.

In the radio communication system 1000 configured as described above, eight combinations of two P-SCH sequences and four synchronization signal transmission patterns may be defined as shown in FIG. 19. The combinations of the P-SCH sequences and the synchronization signal transmission patterns may be associated with cell IDs or cell ID groups such that use of the same combination of a P-SCH sequence and a synchronization signal transmission pattern in adjacent cells is prevented. With the association information, the synchronization signal control unit $209_1$ of the base station $200_m$ can determine a P-SCH sequence and subframes and slots used to transmit the P-SCH and the S-SCH based on the cell ID or the cell ID group of a cell where the base station $200_m$ provides communications based on Evolved UTRA and UTRAN. In this case, the S-SCH does not have to include an information item indicating which one of synchronization signal transmission patterns #1, #2, #3, and #4 is used to transmit the synchronization signals, i.e., the P-SCH and the S-SCH. This is because the mobile station can determine which one of synchronization signal transmission patterns #1, #2, #3, and #4 is used to transmit the synchronization signals based on the time interval between received P-SCHs.

With the combinations defined in FIG. 19, P-SCHs based on different combinations are transmitted at different timings or use different P-SCH sequences. Thus, using the combinations as defined in FIG. 19 makes it possible to prevent characteristic degradation of S-SCHs.

Generally, a communication area provided by the base station $200_m$ is divided into two or more sub-areas called sectors. When the base station $200_m$ covers multiple sectors, the cell ID or the cell ID group may be used to identify an area including all of the sectors or to identify each of the sectors. When the cell ID or the cell ID group is used to identify an area including all sectors of the base station $200_m$, combinations of synchronization signal sequences and subframes and slots used to transmit synchronization signals are defined for each base station $200_m$. When the cell ID or the cell ID group is used to identify each sector of the base station $200_m$, combinations of synchronization signal sequences and subframes and slots used to transmit synchronization signals are defined for each sector of the base station $200_m$.

As the P-SCH sequence, any one of the following sequences may be used: a constant amplitude zero autocorrelation (CAZAC) sequence such as a Zadoff-Chu sequence (C. Chu, "Polyphase codes with good periodic correlation properties," IEEE Trans. Inform. Theory, vol. II-18, pp. 531-532, July 1972); a Frank sequence (R. L. Frank and S. A. Zadoff, "Phase shift pulse codes with good periodic correlation properties," IRE Trans. Inform. Theory, vol. IT-8, pp. 381-382, 1962); a Golay sequence (M. J. E. Golay, "Complementary Series," IRE Trans. Inform. Theory, vol. 7, pp. 82-87, April 1961); a double repetitive Golay complementary sequence (R1-062487, Hierarchical SCH signals suitable for both (FDD and TDD) modes of E-UTRA); and a pseudo noise (PN) sequence.

As the S-SCH sequence, any one of the following sequences may be used: a two-layered S-SCH sequence obtained by multiplying an orthogonal or non-orthogonal sequence by an orthogonal or non-orthogonal scrambling sequence (3GPP, R1-070146, S-SCH Sequence Design); an S-SCH sequence composed of multiple orthogonal or non-orthogonal sequences arranged alternately in the frequency domain; an S-SCH sequence obtained by multiplying multiple orthogonal or non-orthogonal sequences by a non-orthogonal or orthogonal scrambling sequence (3GPP R1-060042, SCH Structure and Cell Search Method in E-UTRA Downlink); an S-SCH sequence composed of multiple orthogonal or non-orthogonal sequences arranged in consecutive subcarriers (3GPP R1-071584, Secondary Synchronization Signal Design); and an S-SCH sequence composed of multiple orthogonal or non-orthogonal sequences arranged in consecutive subcarriers and multiplied by a non-orthogonal or orthogonal scrambling sequence. Examples of orthogonal sequences include a Walsh-Hadamard sequence, a phase-rotated orthogonal sequence, and an orthogonal M-sequence. Examples of non-orthogonal sequences include a CAZAC sequence such as a GCL sequence; a Golay sequence; a Golay complementary sequence (M. J. E. Golay, "Complementary Series," IRE Trans. Inform. Theory, vol. 7, pp. 82-87, April 1961); an M-sequence (3GPP, R1-072093, Details on SSC Sequence Design); and a PN sequence.

The synchronization signal generator $209_2$ generates a synchronization signal sequence based on the synchronization signal sequence information and the synchronization signal transmission timing information reported from the synchronization signal control unit $209_1$. The synchronization signal sequence is either the P-SCH or the S-SCH.

Figure 20:
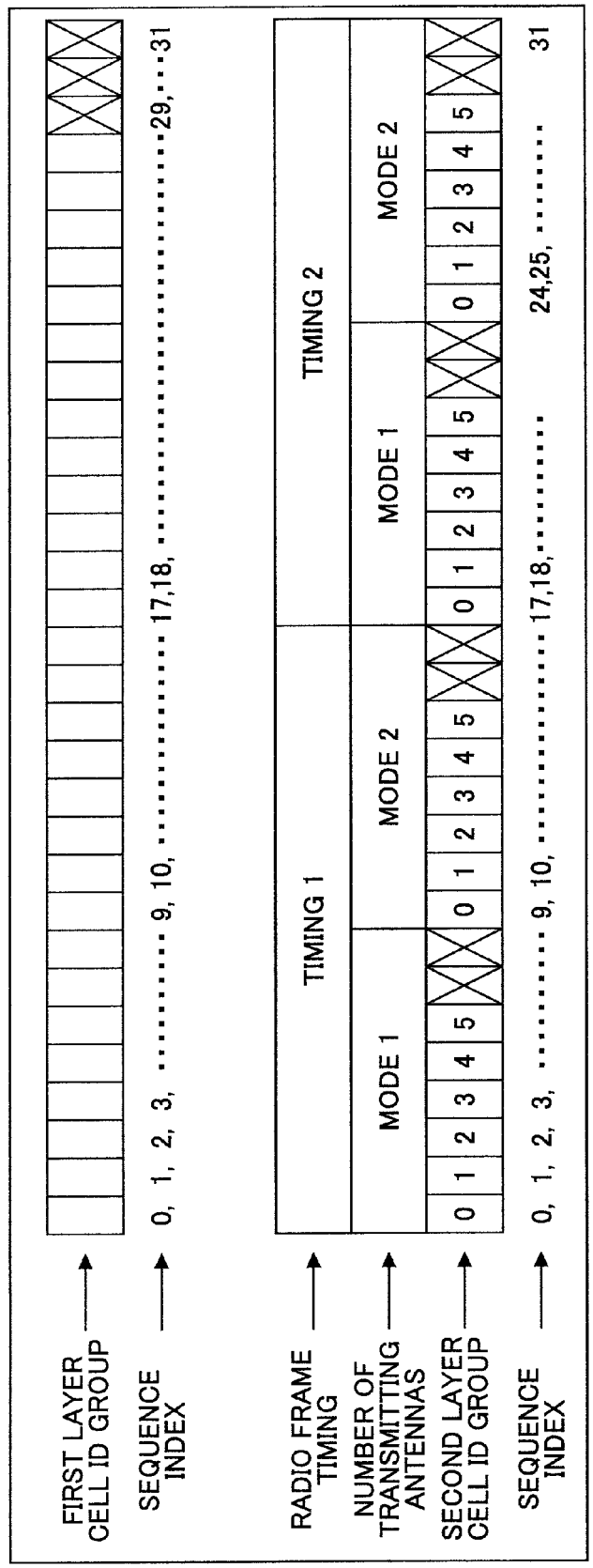
FIG. 20 is a drawing illustrating a method of mapping S-SCH sequences according to an embodiment of the present invention.

For example, when generating the S-SCH, the synchronization signal generator $209_2$ may include cell-specific information in the S-SCH in a layered manner. The cell-specific information includes at least one of a cell ID group, a radio frame timing, and the number of transmitting antennas. Here, the radio communication system 1000 may be configured to report to the mobile station a part of layered information as prior information (e.g., neighboring cell information) for a cell search. For example, the prior information may include a cell ID group, a part of the cell ID group, a radio frame timing, the number of transmitting antennas, or any combination of them. The prior information makes it possible to reduce the number of sequences that the mobile station has to detect in a cell search. For example, a cell ID group may be represented by a combination of sequence indexes of different sequences. In the example shown in FIG. 20, two sequences with a length of 32 chips (short codes) are used. In FIG. 20, cell ID groups are uniquely identified by combinations of 29 first layer cell ID groups and 6 second layer cell ID groups (29×6=174 cell ID groups can be identified). Also, a radio frame timing and/or the number of transmitting antennas may be transmitted for the second sequence. For example, if a cell ID group is reported as the prior information, the mobile station has to detect only the radio frame timing and the number of transmitting antennas during handover.

In LTE, it is proposed to use 29 hopping patterns and 6 shifting patterns to transmit downlink reference signals (see, for example, 3GPP, R1-071641, Frequency Hopping/Shifting of Downlink Reference Signal in E-UTRA). For example, information to be transmitted using combinations of 29 sequences and 6 sequences may be associated with frequency hopping/shifting patterns of downlink reference signals. With this method, if a frequency hopping pattern is reported as the prior information, a first layer cell ID group is also reported. Thus, this method makes it possible to eliminate the step of identifying the first layer cell ID group.

Also, reporting the number of transmitting antennas and/or a radio frame timing as neighboring cell information makes it possible to reduce the number of sequences that have to be detected.

The data modulation unit $209_3$ data-modulates the synchronization signal sequence generated by the synchronization signal generator $209_2$, and the serial-parallel converting unit $209_4$ converts the modulated synchronization signal sequence into $N_{sCH}$ symbols arranged along the frequency axis by serial-parallel conversion. Then, the multipliers $209_5$ multiply the $N_{sCH}$ symbols by an amplitude adjusting sequence value input from the amplitude adjusting unit $209_6$ and output the multiplied symbols to the combining unit $208_{11}$.

Figure 21:
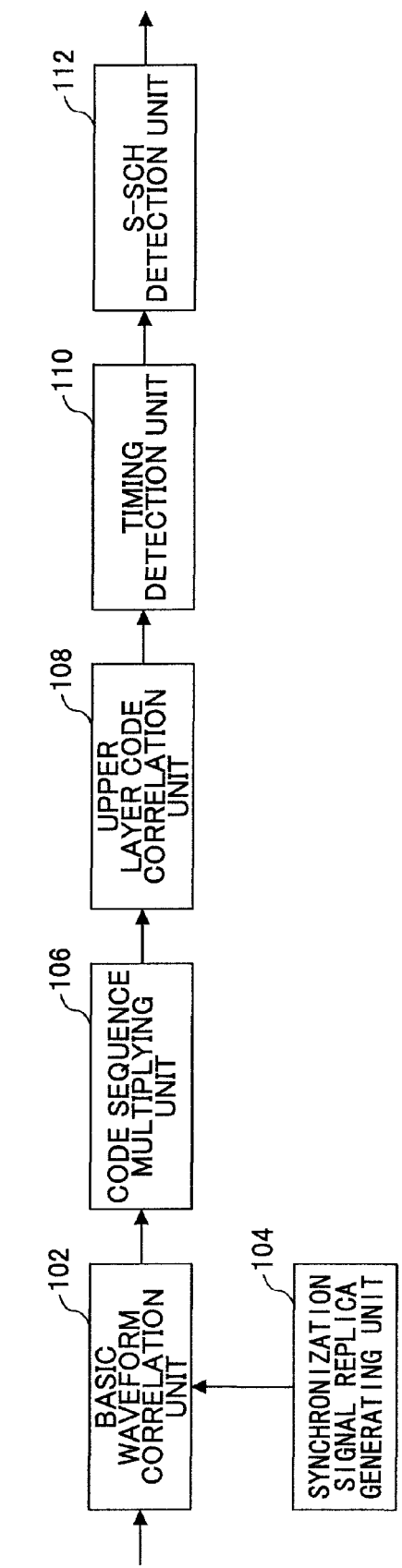
FIG. 21 is a partial block diagram illustrating a mobile station according to an embodiment of the present invention.

Next, the mobile station 100 of this embodiment is described with reference to FIG. 21.

The mobile station 100 includes a basic waveform correlation unit 102, a synchronization signal replica generating unit 104, a code sequence multiplying unit 106, an upper layer code correlation unit 108, a timing detection unit 110, and an S-SCH detection unit 112.

In the mobile station 100, a multi-carrier signal received via an antenna is input to the basic waveform correlation unit 102. The synchronization signal replica generating unit 104 generates a synchronization signal replica with a predetermined basic waveform and inputs the generated synchronization signal replica to the basic waveform correlation unit 102. The basic waveform correlation unit 102 detects the correlation between the received multi-carrier signal and the synchronization signal replica with the basic waveform. The code sequence multiplying unit 106 multiplies an output from the basic waveform correlation unit 102 by a code sequence (or performs sign inversion on the output). The upper layer code correlation unit 108 detects the correlation between an output from the code sequence multiplying unit 106 and an upper layer code. Thus, the mobile station 100 detects the correlation between a P-SCH and a replica.

The timing detection unit 110 detects a P-SCH timing and a P-SCH sequence number based on the correlation value. When the P-SCH timing is detected, the S-SCH detection unit 112 detects an S-SCH using the P-SCH as a reference signal. If, for example, a cell ID group is reported as prior information, the S-SCH detection unit 112 detects a radio frame timing and the number of transmitting antennas. Here, if the synchronization signals are scrambled at the base station, it is necessary to descramble the synchronization signals.

An exemplary cell search process is described below.

A cell search is performed based on the P-SCH and the S-SCH included in a downlink signal. More specifically, a cell search is performed based on a P-SCH sequence and S-SCH sequences defined in the radio communication system 1000 described above. The mobile station 100 detects the P-SCH sequence and the S-SCH sequences and thereby detects a cell ID or a cell ID group. After detecting the cell ID, the mobile station receives broadcast information using a scrambling code associated with the cell ID and terminates the cell search process. P-SCH sequences and synchronization signal transmission patterns defined in the radio communication system 1000 are described above in relation to the base station $200_m$ and therefore their descriptions are omitted here.

If, for example, a synchronization signal transmission pattern is defined in the radio communication system 1000 as shown in FIG. 8 and P-SCH sequences are associated with cell ID information, the timing detection unit 110 determines synchronization channel timings and a P-SCH sequence. Also, the S-SCH detection unit 112 can detect cell-specific information by, for example, detecting an information item in the S-SCH.

Alternatively, synchronization signal transmission patterns as shown in FIG. 9 and eight combinations of P-SCH sequences and the synchronization signal transmission patterns as shown in FIG. 10 may be defined in the radio communication system 1000, and the S-SCH may include an information item indicating which one of synchronization signal transmission patterns #1 and #4 is used to transmit the synchronization signals, i.e., the P-SCH and the S-SCH. In this case, the S-SCH detection unit 112 can determine which one of synchronization signal transmission patterns #1 and #4 is used to transmit the synchronization signals based on the information item included in the S-SCH. With this configuration, the timing detection unit 110 can determine a cell ID or a cell ID group by determining a P-SCH sequence and a synchronization signal transmission pattern.

As another example, synchronization signal transmission patterns as shown in FIG. 9 and eight combinations of P-SCH sequences and the synchronization signal transmission patterns as shown in FIG. 11 may be defined in the radio communication system 1000. In this case, even if the S-SCH does not include an information item indicating which one of synchronization signal transmission patterns #2 and #3 is used to transmit the synchronization signals, i.e., the P-SCH and the S-SCH, the basic waveform correlation unit 102 can determine which one of synchronization signal transmission patterns #2 and #3 is used to transmit the synchronization signals based on the time interval between received P-SCHs. With this configuration, the timing detection unit 110 can determine a cell ID or a cell ID group by determining a P-SCH sequence and a synchronization signal transmission pattern.

As another example, synchronization signal transmission patterns as shown in FIG. 9 and nine combinations of P-SCH sequences and the synchronization signal transmission patterns as shown in FIG. 12 may be defined in the radio communication system 1000. In this case, even if the S-SCH does not include an information item indicating which one of synchronization signal transmission patterns #1, #2, and #3 is used to transmit the synchronization signals, i.e., the P-SCH and the S-SCH, the basic waveform correlation unit 102 can determine which one of synchronization signal transmission patterns #1, #2, and #3 is used to transmit the synchronization signals based on the time interval between received P-SCHs. With this configuration, the timing detection unit 110 can determine a cell ID or a cell ID group by determining a P-SCH sequence and a synchronization signal transmission pattern.

As another example, synchronization signal transmission patterns as shown in FIG. 9 and eight combinations of P-SCH sequences and the synchronization signal transmission patterns as shown in FIG. 13 may be defined in the radio communication system 1000, and the S-SCH may include an information item indicating which one of synchronization signal transmission patterns #1, #2, #3, and #4 is used to transmit the synchronization signals, i.e., the P-SCH and the S-SCH. In this case, the S-SCH detection unit 112 can determine which one of synchronization signal transmission patterns #1, #2, #3, and #4 is used to transmit the synchronization signals based on the information item included in the S-SCH. With this configuration, the timing detection unit 110 can determine a cell ID or a cell ID group by determining a P-SCH sequence and a synchronization signal transmission pattern.

As another example, synchronization signal transmission patterns as shown in FIG. 14 and eight combinations of P-SCH sequences and the synchronization signal transmission patterns as shown in FIG. 15 may be defined in the radio communication system 1000. In this case, even if the S-SCH does not include an information item indicating which one of synchronization signal transmission patterns #1 and #2 is used to transmit the synchronization signals, i.e., the P-SCH and the S-SCH, the timing detection unit 110 can determine which one of synchronization signal transmission patterns #1 and #2 is used to transmit the synchronization signals based on the time interval between received P-SCHs. With this configuration, the timing detection unit 110 can determine a cell ID or a cell ID group by determining a P-SCH sequence and a synchronization signal transmission pattern.

As another example, synchronization signal transmission patterns as shown in FIG. 16 and nine combinations of P-SCH sequences and the synchronization signal transmission patterns as shown in FIG. 17 may be defined in the radio communication system 1000, and the S-SCH may include an information item indicating which one of synchronization signal transmission patterns #1, #2, and #3 is used to transmit the synchronization signals, i.e., the P-SCH and the S-SCH.

In this case, the timing detection unit 110 can determine which one of synchronization signal transmission patterns #1, #2, and #3 is used to transmit the synchronization signals based on the information item included in the S-SCH. With this configuration, the timing detection unit 110 can determine a cell ID or a cell ID group by determining a P-SCH sequence and a synchronization signal transmission pattern.

As still another example, synchronization signal transmission patterns as shown in FIG. 18 and eight combinations of P-SCH sequences and the synchronization signal transmission patterns as shown in FIG. 19 may be defined in the radio communication system 1000. In this case, even if the S-SCH does not include an information item indicating which one of synchronization signal transmission patterns #1, #2, #3, and #4 is used to transmit the synchronization signals, i.e., the P-SCH and the S-SCH, the timing detection unit 110 can determine which one of synchronization signal transmission patterns #1, #2, #3, and #4 is used to transmit the synchronization signals based on the time interval between received P-SCHs. With this configuration, the timing detection unit 110 can determine a cell ID or a cell ID group by determining a P-SCH sequence and a synchronization signal transmission pattern.

Next, a synchronization channel transmission method of this embodiment is described.

The synchronization signal generator $209_2$ selects plural synchronization signal sequences. For example, the synchronization signal generator $209_2$ selects two types of sequences, i.e., one from 29 short codes and one from 6 short codes. Then, the synchronization signal generator $209_2$ generates prior information to be reported to the mobile station in advance using a part of the selected synchronization signal sequences. For example, the synchronization signal generator $209_2$ generates prior information indicating a first layer cell ID group constituting a part of cell ID group identification information, and the prior information is transmitted.

The synchronization signal generator $209_2$ also generates a secondary synchronization channel using another part of the selected synchronization signal sequences. For example, the synchronization signal generator $209_2$ generates a secondary synchronization channel indicating a second layer cell ID group that constitutes the cell ID group identification information together with the first layer cell ID group, and the secondary synchronization channel is transmitted. Then, the mobile station detects cell-specific information based on the prior information and the secondary synchronization channel.

Figure 22:
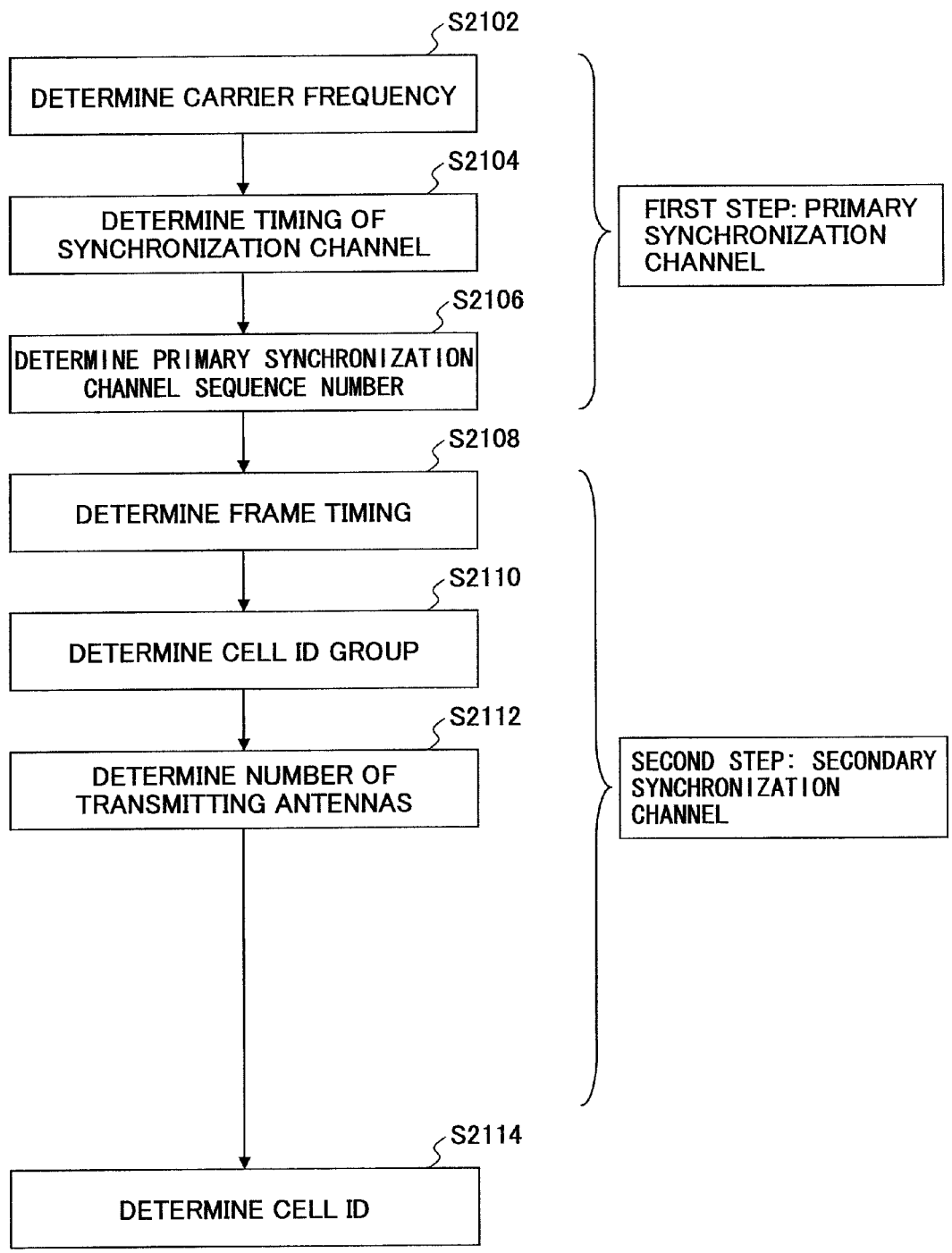
FIG. 22 is a flowchart showing a cell search method according to an embodiment of the present invention.

Next, a cell search method in the radio communication system 1000 of this embodiment is described with reference to FIG. 22.

In a first step, the mobile station detects the correlation between a primary synchronization channel sequence and a received signal and thereby determines the carrier frequency and the timing of the primary synchronization channel (S2102, S2104). As a result, a primary synchronization channel sequence number is determined (S2106). The mobile station may be configured to also obtain the phase difference of the signal and perform frequency offset compensation in the first step.

With the determined transmission timing and carrier frequency of the primary synchronization channel and the determined primary synchronization channel sequence number, the mobile station can determine the transmission timing and the carrier frequency of a secondary synchronization channel. The mobile station determines a frame timing based on a cell-specific secondary synchronization channel sequence used for the secondary synchronization channel (S2108).

Typically, plural (e.g., two) synchronization channels are arranged in each frame. Therefore, the frame timing is determined after the transmission timing is determined. The mobile station also determines a cell ID group based on the cell-specific secondary synchronization channel sequence (S2110).

Here, it is possible to reduce the number of candidates of cell-specific information that have to be detected and improve the detection accuracy by reporting a part or entirety of the cell ID group in advance as prior information to the mobile station. This in turn makes it possible to improve the communication quality. The prior information may instead include a radio frame timing or the number of transmitting antennas.

When the base station has multiple transmitting antennas, the base station may be configured to report the number of transmitting antennas via the secondary synchronization channel to the mobile station, and the mobile station may be configured to determine the number of transmitting antennas (the number of antennas in multiple input multiple output (MIMO)) in a second step (S2112). For example, the mobile station determines the number of transmitting antennas used by the base station to transmit a broadcast channel.

Then, the mobile station determines a cell ID based on the cell ID group determined in the second step and the primary synchronization channel sequence number determined in the first step (S2114).

Next, a radio communication system including a base station and a mobile station according to another embodiment of the present invention is described.

The radio communication system of this embodiment has substantially the same configuration as that described with reference to FIG. 3. Also, configurations of the base station and the mobile station of this embodiment are substantially the same as those described with reference to FIGS. 6, 7, and 21.

As proposed by 3GPP (see, for example, 3GPP TS 36.211 V1.0.0 (2007-03) and 3GPP, R1-071794, Way forward for stage 2.5 details of SCH), multiple, for example, three types of Zadoff-Chu sequences are to be used for the P-SCH and a binary sequence obtained by combining two types of short codes are to be used for the S-SCH.

The P-SCH and the S-SCH are transmitted every 5 ms. In an inter-base-station synchronous system where signals from plural cells are synchronized, the mobile station receives the signals from the cells at the same time. If the cells transmit the same S-SCHs every 5 ms, interference of the S-SCHs occurs every 5 ms in a given cell.

In the radio communication system described with reference to FIG. 3, each of the base stations $200_1$, $200_2$, and $200_3$, for example, transmits the P-SCH and the S-SCH using subframes and slots defined in the synchronization signal transmission pattern shown in FIG. 8. For example, multiple sequences are provided for the P-SCH, the S-SCH is represented by a combination of two short codes, and the synchronization signals are transmitted every 5 ms in subframe #1 and subframe #6. In this case, as described with reference to FIG. 20, the same sequence (short code) is used as the first layer cell ID group for the S-SCH in subframe #1 and subframe #6.

This is described in more detail with reference to FIG. 23. In the cell $50_1$ (cell #1), a short code with sequence index (sequence number) 1 is used as one of two short codes, i.e., the first layer cell ID group and a short code with sequence index 2 is used as the other one of the two short codes, i.e., the second layer cell ID group, for the S-SCH to be transmitted in subframe #1 (frame timing #1); and a short code with sequence index 1 is used as the first layer cell ID group and a short code with sequence index 7 is used as the second layer cell ID group for the S-SCH to be transmitted in subframe #6 (frame timing #2).

Meanwhile, in the cell 50$_2$ (cell #2), a short code with sequence index 1 is used as the first layer cell ID group and a short code with sequence index 3 is used as the second layer cell ID group for the S-SCH to be transmitted at frame timing #1; and a short code with sequence index 1 is used as the first layer cell ID group and a short code with sequence index 8 is used as the second layer cell ID group for the S-SCH to be transmitted at frame timing #2.

If the same short code is used as the first layer cell ID group in adjacent cells as described above, it means that the same sequence is used both in radio frame timing #1 and radio frame timing #2 in the adjacent cells. Therefore, the maximum probability of collision of S-SCH sequences in the 10-ms radio frame becomes 1/2. In this case, due to the interference caused by the S-SCH from an adjacent cell, it becomes difficult for the mobile station 100 in a given cell to detect the S-SCH with the short code used for the first layer cell ID group and to detect the S-SCH with the short code used for the second layer cell ID group. As a result, the detection probability of the S-SCH is reduced.

As described above, S-SCH sequences of adjacent cells collide with each other if short codes with the same sequence number are used for the S-SCH sequences. To prevent collision of S-SCH sequences of adjacent cells, i.e., collision of two symbols of S-SCH in the 10-ms radio frame, a short code sequence number mapping (permutation) method is proposed (see, for example, 3GPP, R1-072368, Mapping of Short Sequences for S-SCH). In this method, the interference between adjacent cells is taken into account in mapping two short codes of S-SCHs to frame timing #1 and frame timing #2. More specifically, in this method, sequence numbers of short codes are selected based on cell-specific information including at least one of the cell ID group, the frame timing, and the number of transmitting antennas to reduce the probability of collision of short codes between adjacent cells and thereby to reduce the interference in a given cell. For example, short code sequence numbers are assigned in advance to each cell ID group such that the maximum probability of collision of S-SCH sequences in the 10-ms radio frame becomes 1/4. In this case, the number of transmitting antennas may also be assigned. As exemplified in FIG. 24, in the cell 50$_2$ (cell #2), a short code with sequence index (sequence number) 4 is used as one of two short codes, i.e., the first layer cell ID group, for the S-SCH to be transmitted at frame timing #2. With this method, even if the same short code is used as the first layer cell ID group in adjacent cells, different sequences are used in radio frame timing #2. Thus, this method makes it possible to reduce the probability of collision.

With this method, however, it is necessary to select S-SCH sequences (short codes) from all possible combinations even if any one of the cell ID group, the frame timing, and the number of transmitting antennas is reported in advance as neighboring cell information in a neighboring cell search. Thus, this method increases the workload of the base station. In other words, this method increases the number of candidates of S-SCH sequences that have to be detected.

Figure 25:
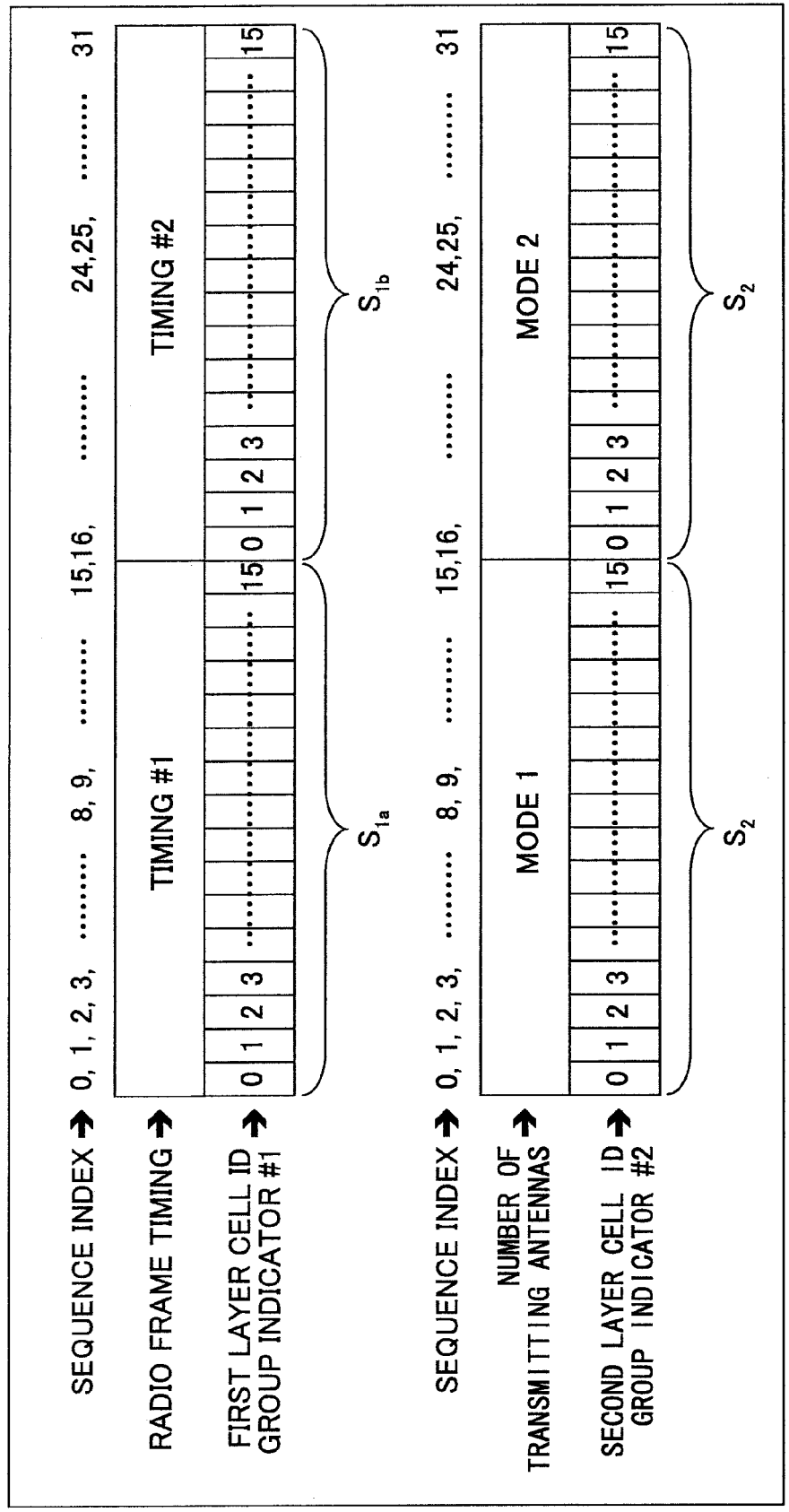
FIG. 25 is a drawing illustrating a method of mapping S-SCH sequences according to an embodiment of the present invention.

For this reason, in the base station 200 of this embodiment, the short code with sequence indexes 0-29 used for the first layer cell ID groups shown in FIG. 20 is divided into two short codes and sequence indexes 0-15 are newly assigned to each of the two short codes as shown in FIG. 25. The newly assigned sequence indexes are called first layer cell ID group indicators. For example, a Walsh-Hadamard sequence may be used as the S-SCH sequence. In FIG. 25, it is assumed that a Walsh-Hadamard sequence with sequence indexes 0-31 are divided into two sequences with sequence indexes 0-15 and 16-31, and first layer cell ID indicators #1: 0-15 are assigned to each of the two sequences. In this case, the first layer cell ID group indicators #1: 0-15 corresponding to sequence indexes 0-15 are used as the first layer cell ID groups for the S-SCH to be transmitted in radio frame timing #1, and the first layer cell ID group indicators #1: 0-15 corresponding to sequence indexes 16-31 are used as the first layer cell ID groups for the S-SCH to be transmitted in radio frame timing #2.

Similarly, a short code with sequence indexes 0-31 used for the second layer cell ID groups is divided into two short codes and sequence indexes 0-15 are newly assigned to each of the two short codes. The newly assigned sequence indexes are called second layer cell ID group indicators. For example, a Walsh-Hadamard sequence may be used as the S-SCH sequence. In FIG. 25, it is assumed that a Walsh-Hadamard sequence with sequence indexes 0-31 are divided into two sequences with sequence indexes 0-15 and 16-31, and second layer cell ID indicators #2: 0-15 are assigned to each of the two sequences. In this case, the second layer cell ID group indicators #2: 0-15 corresponding to sequence indexes 0-15 are used as the second layer cell ID groups for the S-SCH to be transmitted in radio frame timing #1, and the second layer cell ID group indicators #2: 0-15 corresponding to sequence indexes 16-31 are used as the second layer cell ID groups for the S-SCH to be transmitted in radio frame timing #2. Although sequence indexes 0-31 are used to indicate short codes representing the first layer cell ID groups and the second layer cell ID groups in the above example, the number of sequence indexes is not limited to 32. For example, to represent about 170 cell ID groups, 16 sequence indexes for the first layer cell ID groups and 11 sequence indexes for the second layer cell ID groups are necessary (16×11=176).

In FIG. 25, cell ID groups are identified by combinations of the first layer cell ID group indicators #1 and the second layer cell ID group indicators #2. For example, a cell ID group at frame timing #1 is identified by a combination of a short code $S_{1a}$ indicated by one of the first layer cell ID group indicators #1 and a short code $S_2$ indicated by one of the second layer cell ID group indicators #2; and a cell ID group at frame timing #2 is identified by a combination of a short code $S_{1b}$ indicated by one of the first layer cell ID group indicators #1 and a short code $S_2$ indicated by one of the second layer cell ID group indicators #2. The combinations are determined such that the cell ID groups identified by $\{S_{1a}, S_2\}$ and $\{S_{1b}, S_2\}$ do not collide with each other. A cell search process can be simplified by reporting prior information including the radio frame timing or the number of transmitting antennas of a target cell. For example, if timing #1 is reported in advance as the prior information, the S-SCH is detected based on the combination of timing #2 and the number of transmitting antennas. In this case, the S-SCH is identified from 16×32 combinations.

Also, to reduce the interference between adjacent cells, cell ID group indicators used in radio frame timings #1 and #2 in a first cell are determined such that at most only one of the first layer cell ID group indicators #1 and the second layer cell ID group indicators #2 matches the corresponding indicator used in a second cell. Also, to reduce the probability of collision between the first layer cell ID group indicators #1 and the second layer cell ID group indicators #2 used in adjacent cells, it is preferable to select sequences (short codes) such that the first layer cell ID group indicators #1 and the second layer cell ID group indicators #2 for the adjacent cells become different. For example, in the cell #1 and the cell #2, it is preferable to select short codes such that all of the first layer cell ID group indicators #1 and the second layer cell ID group indicators #2 at timing #1 and the first layer cell ID group indicators #1 and the second layer cell ID group indicators #2 at timing #2 become different from each other. Alternatively, the indicators may be determined such that at most only one of the indicators in a first cell becomes the same as the corresponding indicator in a second cell.

The synchronization signal control unit $209_1$ determines a P-SCH sequence number, subframes and slots used to transmit the P-SCH and the S-SCH, and synchronization signal transmission timings based on the cell ID or the cell ID group of a cell where the base station $200_m$ provides communications based on Evolved UTRA and UTRAN, and inputs the synchronization signal sequence information and the synchronization signal transmission timing information to the synchronization signal generator $209_2$.

The synchronization signal generator $209_2$ generates a synchronization signal sequence based on the synchronization signal sequence information and the synchronization signal transmission timing information reported from the synchronization signal control unit $209_1$. The synchronization signal sequence is either the P-SCH or the S-SCH.

For example, when generating the S-SCH, the synchronization signal generator $209_2$ includes predetermined layered sequences in the S-SCH. Here, the radio communication system 1000 may be configured to report to the mobile station a part of the layered sequences as prior information (e.g., neighboring cell information) used in a cell search. For example, the prior information may include a cell ID group, a part of the cell ID group, a radio frame timing, the number of transmitting antennas, or any combination of them. The prior information makes it possible to reduce the number of sequences that the mobile station has to detect in a cell search. For example, as shown in FIG. 25, a cell ID group is represented using two sequences with a sequence length of 32. In FIG. 25, a sequence 1 having a sequence length of 32 and used to indicate first layer cell ID groups is divided into two sequences and indicators 0-15 are assigned to each of the two sequences; and a sequence 2 having a sequence length of 32 and used to represent second layer cell ID groups is divided into two sequences and indicators 0-15 are assigned to each of the two sequences. In this case, the synchronization signal control unit $209_1$ determines synchronization signal sequences such that at most only one of the first layer cell ID group indicator #1 and the second layer cell ID group indicator #2 at timing #1 and the first layer cell ID group indicator #1 and the second layer cell ID group indicator #2 at timing #2 matches the corresponding indicator used in an adjacent cell.

A radio frame timing may be transmitted for the first layer cell ID group indicator #1 (sequence 1) and the number of transmitting antennas may be transmitted for the second layer cell ID group indicator #2 (sequence 2). Alternatively, the radio frame timing may be transmitted for the sequence 2 and the number of transmitting antennas may be transmitted for the sequence 1. For example, if timing #1 is reported as prior information to the mobile station, the mobile station has to detect only a second layer cell ID group indicator #2 at timing #1 and a first layer cell ID group indicator #1 and a second layer cell ID group indicator #2 at timing #2.

According to the above embodiment, if neighboring cell information including any one of a cell ID group, a frame timing, and the number of transmitting antennas is reported, it is possible to identify an S-SCH sequence from a lesser number of S-SCH sequences based on the reported neighboring cell information and thereby to reduce the processing load of the mobile station.

Also, the above embodiment makes it possible to map system information taking into account permutations and thereby to randomize the interference from an adjacent cell when the adjacent cell and a cell of the base station use the same S-SCH sequence. This in turn makes it possible to improve the detection probability of the S-SCH and to improve the cell search time characteristic. In other words, the above embodiment makes it possible to reduce cell search time. For example, with the above embodiment, it is possible to reduce the number of candidates of S-SCH sequences that have to be detected in a neighboring cell search by reporting neighboring cell information in advance to the user equipment. This in turn makes it possible to improve the accuracy of detecting the S-SCH and to improve the cell search time characteristic.

Also, the above embodiment makes it possible to reduce the number of candidates of S-SCH sequences that have to be detected by providing the user equipment with prior information. This in turn makes it possible to simplify a cell search method.

In this embodiment, as shown in FIG. 25, first layer cell ID groups are associated with radio frame timings, and second layer cell ID groups are associated with numbers of transmitting antennas. However, the mapping method (the method of determining S-SCH sequences) taking into account the permutations may also be employed in a case where second layer cell ID groups are associated with radio frame timings and numbers of transmitting antennas as shown in FIG. 20. As described above, it is possible to improve the accuracy of detecting the S-SCH by combining the permutations and the layered mapping method.

Figure 26:
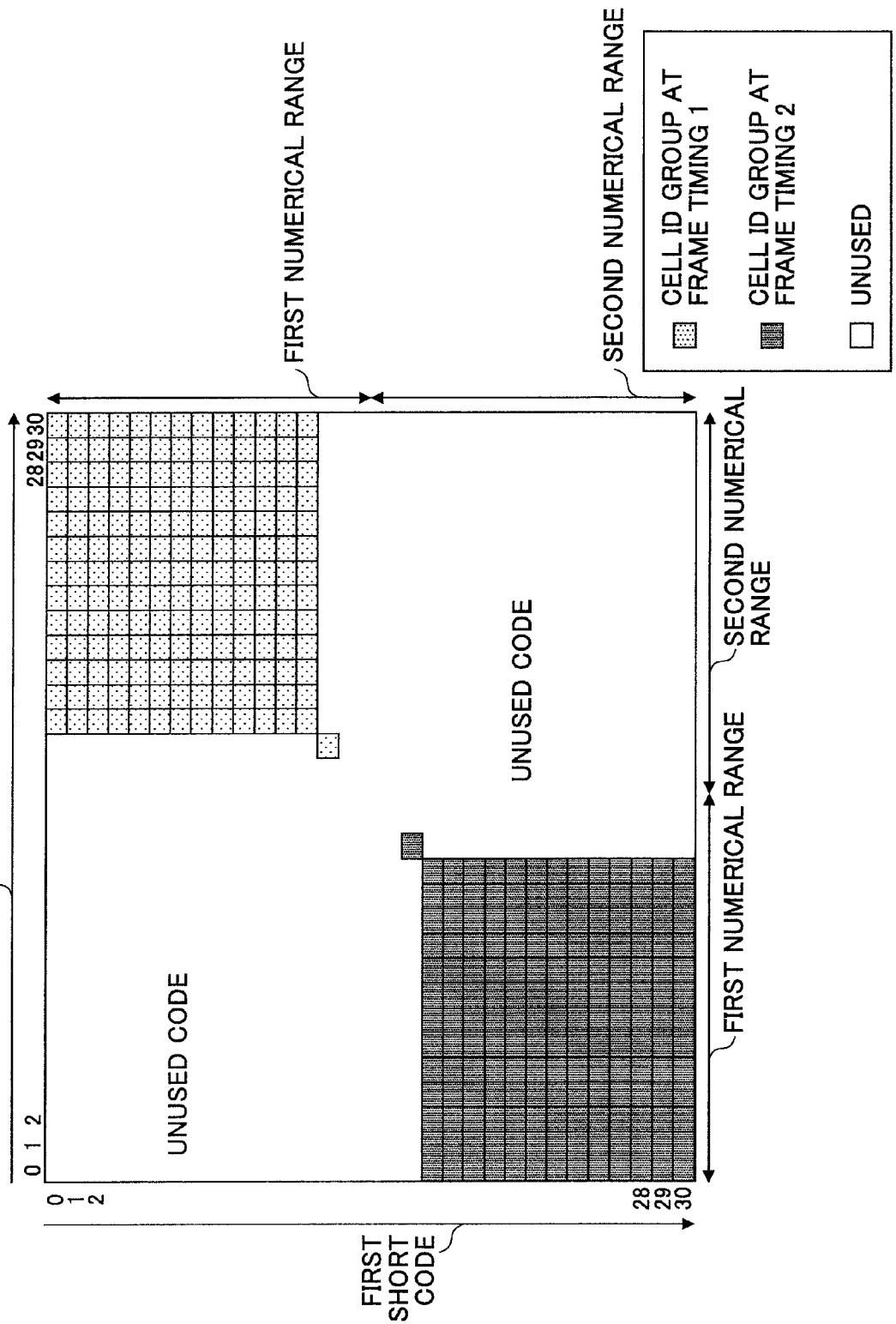
FIG. 26 is a drawing illustrating a method of determining S-SCH sequences.

FIG. 26 is a drawing illustrating another method of determining S-SCH sequences. In FIG. 26, a first short code arranged along the vertical axis indicates sequence indexes of a first one of two short codes with a sequence length of 31 used for S-SCH sequences; and a second short code arranged along the horizontal axis indicates sequence indexes of a second one of the two short codes. In this example, each of the first short code and the second short code has 31 sequence indexes. However, as described above, the number of sequence indexes assigned to each of the first short code and the second short code may be limited as needed.

As shown in FIG. 26, a sequence index of the first short code used at (frame) timing #1 is selected from a first numerical range (0-13); and a sequence index of the second short code used at timing #1 is selected from a second numerical range (23-30). Meanwhile, a sequence index of the first short code used at timing #2 that is 5 ms after timing #1 is selected from the second numerical range (23-30); and a sequence index of the second short code used at timing #2 is selected from the first numerical range (0-13).

Selecting sequence indexes to be used at timings #1 and #2 from different numerical ranges makes it possible to reduce the number of candidates of the first and second short codes to be searched and thereby makes it possible to reduce the time necessary for the search. Also with this method, as soon as a sequence index of the first short code is detected, it is possible to determine that the sequence index is used at timing #1.

Figure 27:
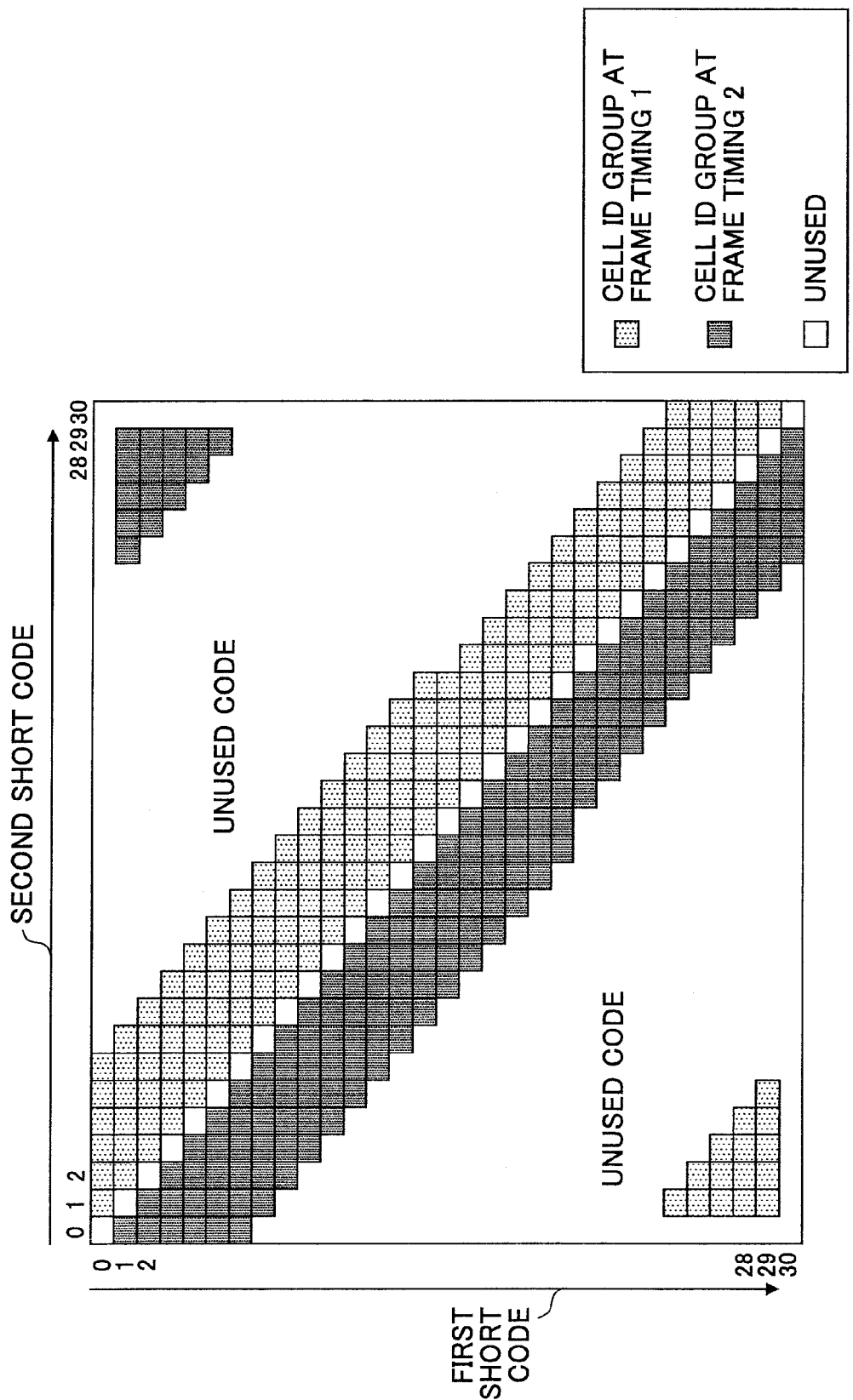
FIG. 27 is a drawing illustrating another method of determining S-SCH sequences.

FIG. 27 is a drawing illustrating another method of determining S-SCH sequences. In the example shown in FIG. 27, sequence indexes of the first and second short codes are selected from the same numerical range (0-30). For descriptive purposes, a sequence index of the first short code is indicated by "m" and a sequence index of the second short code is indicated by "n". In FIG. 27, a combination of sequence indexes m and n is selected to satisfy m−n≦Δ or n−m≦Δ. Here, m and n are integers between 0 and 30, and Δ is an integer less than or equal to 29. With this method, sequence indexes are selected from a numerical range wider than that in the method shown in FIG. 26. In other words, this method increases the flexibility in selecting a combination of codes used for the secondary synchronization channel. Accordingly, this method is preferable to prevent collision of codes as shown in FIG. 23.

Figure 28:
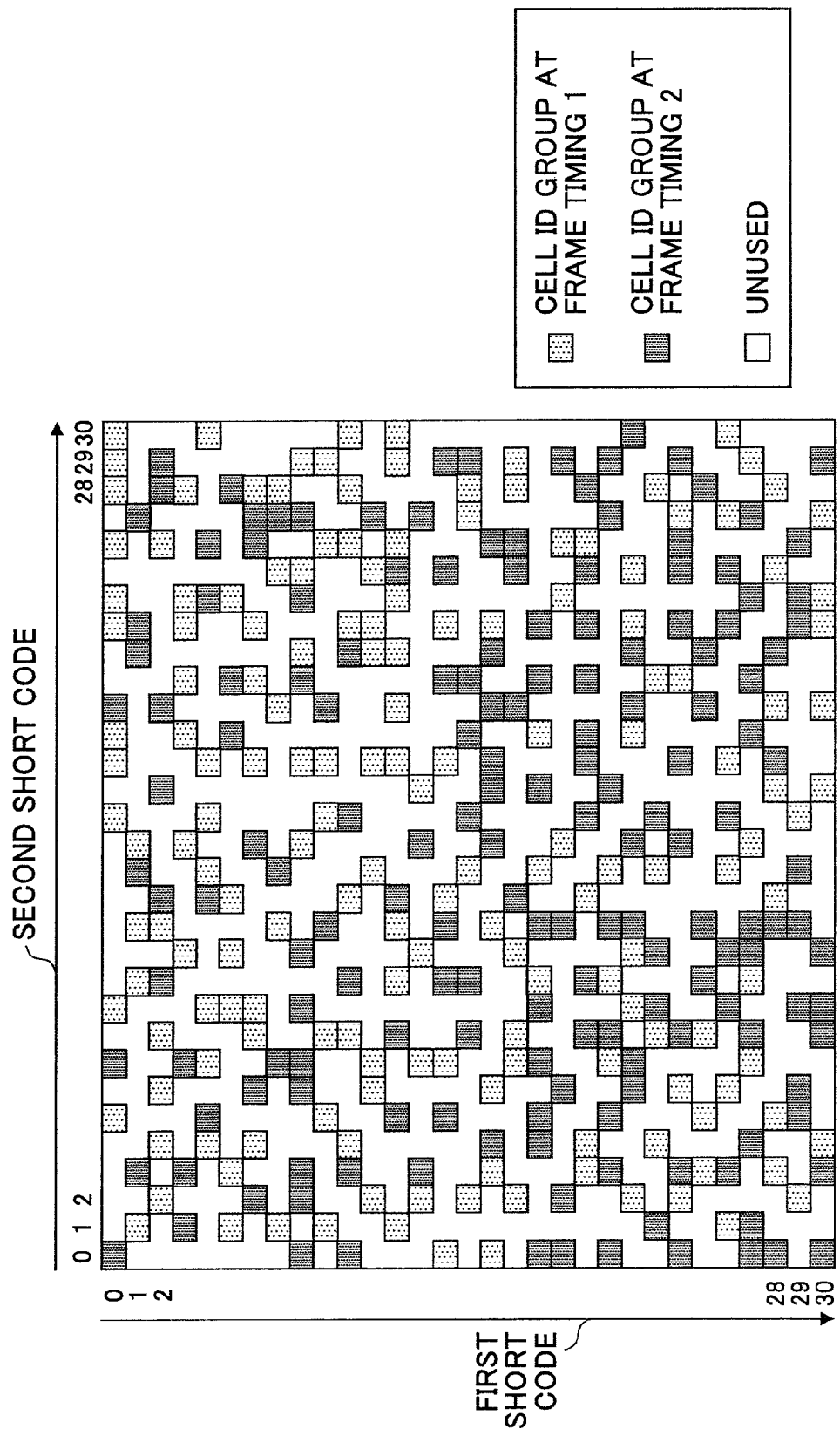
FIG. 28 is a drawing illustrating still another method of determining S-SCH sequences.

FIG. 28 is a drawing illustrating another method of determining S-SCH sequences. Also in this method, sequence indexes of the first and second short codes are selected from the same numerical range (0-30). However, no simple rule as shown in FIG. 27 is provided in this method. In this method, sequence indexes of the first and second short codes are selected in various manners such that the same combination is not generated.

Next, a method that can more reliably prevent collision of short codes is described.

FIG. 29 is similar to FIG. 23 and shows configurations of secondary synchronization channels (S-SCHs) to be transmitted to the user device at frame timings #1 and #2 from adjacent cells #1 and #2. In FIG. 23, short codes are indicated by numbers such as 1 and 2. Meanwhile, in FIG. 29, short codes are indicated by symbols such as $M_1$ and $M_2$. The secondary synchronization channel (S-SCH) to be transmitted at frame timing #1 from the cell #1 is composed of $M_1$ and $M_2 \times SC_1$, and the secondary synchronization channel (S-SCH) to be transmitted at frame timing #1 from the cell #2 is composed of $M_1$ and $M_3 \times SC_1$. This method is the same as that shown in FIG. 23 in that $M_1$ and $M_2$ are used by the cell #1 and $M_1$ and $M_3$ are used by the cell #2. However, this method is different from that shown in FIG. 23 in that a scrambling code $SC_1$ is used for the short codes #2.

FIG. 30 shows the correspondence between short codes $M_1$ and scrambling codes $SC_1$. The short codes $M_1$ correspond to the sequences $P_1$ shown in FIG. 1 and are made of, for example, M sequences with a code length of 31. The secondary synchronization channel is, for example, a code with a code length of 62 and composed of a pair of short codes. The scrambling codes $SC_1$ associated with the short codes $M_1$ may be any types of codes as long as the short codes $M_1$ can be converted into different codes when multiplied by the scrambling codes $SC_1$. For example, M sequences with a code length of 31 may be used as the scrambling codes $SC_1$.

At frame (synchronization) timing #1 shown in FIG. 29, the secondary synchronization channel (S-SCH) to be transmitted from the cell #1 is composed of $M_1$ and $M_2 \times SC_1$. Meanwhile, the secondary synchronization channel (S-SCH) to be transmitted from the cell #2 is composed of $M_1$ and $M_3 \times SC_1$. In this case, codes $M_1$ used in the cells #1 and #2 collide with each other.

At frame (synchronization) timing #2 that is 5 ms after frame timing #1, the secondary synchronization channel (S-SCH) to be transmitted from the cell #1 is composed of $M_2$ and $M_1 \times SC_2$. Thus, a code used as the short code #1 at timing #1 is used as the short code #2 at timing #2. Similarly, a code used as the short code #2 at timing #1 is used as the short code #1 at timing #2. Meanwhile, at each of timings #1 and #2, the short code #2 is multiplied by a scrambling code corresponding to the short code #1. At timing #2, both of the cells #1 and #2 use $M_1$ as the short code #2 and therefore a collision occurs if the short code #2 is used as is. However, since $M_1$ is multiplied by the scrambling code $SC_2$ in the cell #1 and $M_1$ is multiplied by the scrambling code $SC_3$ in the cell #2, the short codes #2 used in the cells #1 and #2 become different.

Thus, this method makes it possible to reliably prevent a collision at timing #2. The mobile station identifies the first short code $M_1$ in the secondary synchronization channel, identifies the scrambling code $SC_1$ based on the correspondence as shown in FIG. 30, descrambles the second short code, and thereby identifies the second layer cell ID group indicator. This method makes it possible to reduce the occurrence of collisions and thereby enables the mobile station to reliably identify a combination of short codes used for the secondary synchronization channel. In the example shown in FIG. 29, two short codes used for timing #1 are also used for timing #2 to effectively reduce the occurrence of collisions. However, this is not essential for the present invention. A secondary synchronization channel may be composed of a short code #1 and a short code #2 scrambled by a scrambling code corresponding to the short code #1.

In the above embodiments, it is assumed that a system based on Evolved UTRA and UTRAN (also called Long Term Evolution or Super 3G) is used. However, a base station, a mobile station, and a synchronization channel transmission method according to the present invention may also be applied to any system employing orthogonal frequency division multiplexing (OFDM) for downlink.

Although the present invention is described above in different embodiments, the distinctions between the embodiments are not essential for the present invention, and the embodiments may be implemented individually or in combination. Although specific values are used in the above descriptions to facilitate the understanding of the present invention, the values are just examples and different values may also be used unless otherwise mentioned.

The present invention is not limited to the specifically disclosed embodiments, and variations and modifications may be made without departing from the scope of the present invention. Although functional block diagrams are used to describe apparatuses in the above embodiments, the apparatuses may be implemented by hardware, software, or a combination of them.

The present international application claims priority from Japanese Patent Application No. 2007-121306 filed on May 1, 2007, Japanese Patent Application No. 2007-161946 filed on Jun. 19, 2007, and Japanese Patent Application No. 2007-211592 filed on Aug. 14, 2007, the entire contents of which are hereby incorporated herein by reference.

The invention claimed is:

1. A base station used in a mobile communication system, comprising:
   a channel generating unit configured to generate synchronization channels to be used in a cell search performed by a user equipment; and
   a transmitting unit configured to wirelessly transmit a signal including the synchronization channels, wherein
   the synchronization channels include a primary synchronization channel for detecting a reception timing and a secondary synchronization channel including cell-specific information;
   the secondary synchronization channel is composed of a combination of different short codes selected from multiple combinations of short codes;
   correspondence among the combinations of short codes, cell identification information, and frame synchronization timings is stored in a memory; and
   the combinations of short codes are determined such that secondary synchronization channels including a same short code are not transmitted from adjacent cells at two or more of the frame synchronization timings in succession.

2. The base station as claimed in claim 1, wherein
the secondary synchronization channel is composed of a first short code identified by a first index number and a second short code identified by a second index number;
for the secondary synchronization channel to be transmitted at a first one of the frame synchronization timings, the first index number is selected from a first numerical range and the second index number is selected from the first numerical range; and
for the secondary synchronization channel to be transmitted at a second one of the frame synchronization timings, the first index number is selected from a second numerical range that is different from the first numerical range and the second index number is selected from the second numerical range.

3. The base station as claimed in claim 1, wherein
the secondary synchronization channel is composed of a first short code identified by a first index number and a second short code identified by a second index number; and
the first index number and the second index number are selected from a same numerical range both for a first one of the frame synchronization timings and a second one of the frame synchronization timings.

4. The base station as claimed in claim 1, wherein
the secondary synchronization channel is composed of a first short code and a second short code; and
the second short code is generated by multiplying a given code by a scrambling code associated with the first short code.

5. The base station as claimed in claim 1, wherein
the secondary synchronization channel to be transmitted at a first one of the frame synchronization timings is composed of a first short code identified by a first index number and a second short code identified by a second index number; and
the secondary synchronization channel to be transmitted at a second one of the frame synchronization timings is composed of a first short code identified by the second index number and a second short code identified by the first index number.

6. The base station as claimed in claim 5, wherein
the first one of the frame synchronization timings is included in one of subframes constituting a frame; and
the second one of the frame synchronization timings is included in another one of the subframes that comes after the one of the subframes including the first one of the frame synchronization timings.

7. The base station as claimed in claim 1, wherein the short codes are made of M sequence codes.

8. The base station as claimed in claim 1, wherein
the secondary synchronization channel is composed of a first short code identified by a first index number and a second short code identified by a second index number; and
the second index number−the first index number≦Δ (Δ indicates a positive integer) is true.

9. A user equipment communicating via a base station in a mobile communication system, comprising:
a receiving unit configured to receive a signal including synchronization channels;
a detecting unit configured to detect reception timing information based on a primary synchronization channel included in the synchronization channels; and
an identification unit configured to identify at least cell identification information based on a secondary synchronization channel included in the synchronization channels, wherein
the secondary synchronization channel is composed of a combination of different short codes selected from multiple combinations of short codes;
correspondence among the combinations of short codes, the cell identification information, and frame synchronization timings is stored in a memory; and
the combinations of short codes are determined such that secondary synchronization channels including a same short code are not transmitted from adjacent cells at two or more of the frame synchronization timings in succession.

10. The user equipment as claimed in claim 9, wherein
the secondary synchronization channel is composed of a first short code identified by a first index number and a second short code identified by a second index number;
for the secondary synchronization channel to be transmitted at a first one of the frame synchronization timings, the first index number is selected from a first numerical range and the second index number is selected from the first numerical range; and
for the secondary synchronization channel to be transmitted at a second one of the frame synchronization timings, the first index number is selected from a second numerical range that is different from the first numerical range and the second index number is selected from the second numerical range.

11. The user equipment as claimed in claim 9, wherein
the secondary synchronization channel is composed of a first short code identified by a first index number and a second short code identified by a second index number; and
the first index number and the second index number are selected from a same numerical range both for a first one of the frame synchronization timings and a second one of the frame synchronization timings.

12. The user equipment as claimed in claim 9, wherein
the secondary synchronization channel is composed of a first short code and a second short code; and
the second short code is generated by multiplying a given code by a scrambling code associated with the first short code.

13. The user equipment as claimed in claim 12, wherein
the secondary synchronization channel to be transmitted at a first one of the frame synchronization timings is composed of a first short code identified by a first index number and a second short code identified by a second index number; and
the secondary synchronization channel to be transmitted at a second one of the frame synchronization timings is composed of a first short code identified by the second index number and a second short code identified by the first index number.

14. The user equipment as claimed in claim 13, wherein
the first one of the frame synchronization timings is included in one of subframes constituting a frame; and
the second one of the frame synchronization timings is included in another one of the subframes that comes after the one of the subframes including the first one of the frame synchronization timings.

15. The user equipment as claimed in claim 9, wherein the short codes are made of M sequences.

16. The user equipment as claimed in claim 9, wherein
the secondary synchronization channel is composed of a first short code identified by a first index number and a second short code identified by a second index number; and
the second index number−the first index number≦Δ (Δ indicates a positive integer) is true.

17. A method used in a mobile communication system, comprising the steps of:
wirelessly transmitting a signal including synchronization channels from a base station to a user equipment;
detecting candidates of a frame synchronization timing based on a primary synchronization channel included in the synchronization channels; and
extracting a secondary synchronization channel from the synchronization channels and identifying multiple combinations of short codes, cell identification info nation, and the frame synchronization timing, wherein
the secondary synchronization channel is composed of a combination of different short codes selected from the combinations of short codes; and
the combinations of short codes are determined such that secondary synchronization channels including a same short code are not transmitted from adjacent cells at two or more of the frame synchronization timings in succession.

18. The method as claimed in claim 17, wherein
the secondary synchronization channel is composed of a first short code identified by a first index number and a second short code identified by a second index number; and
the second index number−the first index number≦Δ (Δ indicates a positive integer) is true.

19. The method as claimed in claim 17, wherein the first index number and the second index number are selected from a same numerical range both for a first one of the frame synchronization timings and a second one of the frame synchronization timings.

20. The method as claimed in claim 17, wherein the second short code is generated by multiplying a given code by a scrambling code associated with the first short code.

21. The method as claimed in claim 17, wherein
the secondary synchronization channel to be transmitted at a first one of the frame synchronization timings is composed of a first short code identified by a first index number and a second short code identified by a second index number; and
the secondary synchronization channel to be transmitted at a second one of the frame synchronization timings is composed of a first short code identified by the second index number and a second short code identified by the first index number.

22. The method as claimed in claim 21, wherein
the first one of the frame synchronization timings is included in one of subframes constituting a frame; and
the second one of the frame synchronization timings is included in another one of the subframes that comes after the one of the subframes including the first one of the frame synchronization timings.

23. The method as claimed in claim 17, wherein the short codes are made of M sequence codes.

* * * * *